United States Patent
Sekino et al.

(10) Patent No.: US 6,794,089 B2
(45) Date of Patent: Sep. 21, 2004

(54) NONAQUEOUS ELECTROLYTE AND NONAQUEOUS ELECTROLYTE SECONDARY BATTERY

(75) Inventors: Masahiro Sekino, Kawasaki (JP); Masashi Fujiwara, Chigasaki (JP); Asako Satoh, Yokohama (JP); Jun Momma, Yokohama (JP); Masayuki Oguchi, Yokohama (JP); Makoto Kato, Yokohama (JP); Hiroyuki Hasebe, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 233 days.

(21) Appl. No.: 09/985,369

(22) Filed: Nov. 2, 2001

(65) Prior Publication Data

US 2002/0164531 A1 Nov. 7, 2002

(30) Foreign Application Priority Data

Feb. 28, 2001 (JP) ........................................ 2001-054937

(51) Int. Cl.$^7$ ................................................. H01M 6/16
(52) U.S. Cl. ........................ 429/331; 429/323; 429/300; 429/231.4; 429/231.8; 429/162; 429/163
(58) Field of Search .............................. 429/331, 176, 429/231.8, 163, 323, 300, 231.4, 162, 164

(56) References Cited

U.S. PATENT DOCUMENTS 6,503,657 B1 * 1/2003 Takami et al. ............... 429/188

FOREIGN PATENT DOCUMENTS

| JP | 4-14769 | 1/1992 |
| JP | 11-97062 | 4/1999 |
| JP | 2000-235868 | 8/2000 |

OTHER PUBLICATIONS

H. Nakagawa, et al., The Electrochemical Society of Japan, pp. 1–4 and 23, "Relationships Between Polymer Electrolyte Compositions and Characteristics of Lithium–Ion Polymer Rechargeable Batteries", 2000 (with partial English translation).

* cited by examiner

*Primary Examiner*—Laura Weiner
(74) *Attorney, Agent, or Firm*—Oblon, Spivak, McClelland, Maier & Neustadt, P.C.

(57) ABSTRACT

Disclosed is a nonaqueous electrolyte comprising a nonaqueous solvent which contains ethylene carbonate (EC), propylene carbonate (PC), γ-butyrolactone (BL), and a fourth component, which is a solvent other than the EC, PC and BL, and the mixing ratio x (% by volume) of EC based on the total amount of the nonaqueous solvent falls within a range of between 15 and 50, the mixing ratio y (% by volume) of PC based on the total amount of the nonaqueous solvent falls within a range of between 2 and 35, the mixing ratio z (% by volume) of BL based on the total amount of the nonaqueous solvent falls within a range of between 30 and 85, and the mixing ratio p (% by volume) of the fourth component based on the total amount of the nonaqueous solvent is larger than 0 and is not larger than 5.

19 Claims, 2 Drawing Sheets

NONAQUEOUS ELECTROLYTE AND NONAQUEOUS ELECTROLYTE SECONDARY BATTERY

CROSS-REFERENCE TO RELATED APPLICATIONS

This application is based upon and claims the benefit of priority from the prior Japanese Patent Application No. 2001-054937, filed Feb. 28, 2001, the entire contents of which are incorporated herein by reference.

BACKGROUND OF THE INVENTION

1. Field of the Invention

The present invention relates to a nonaqueous electrolyte and a nonaqueous electrolyte secondary battery.

2. Description of the Related Art

Nowadays, a lithium ion secondary battery is put on the market as a nonaqueous electrolyte secondary battery for a portable apparatus such as a portable telephone. As an example of such a lithium ion secondary battery is a secondary battery comprising a positive electrode containing lithium cobalt oxide (e.g., $LiCoO_2$), a negative electrode containing a graphitized material or a carbonaceous material, a nonaqueous electrolyte containing as a main component an organic solvent having a lithium salt dissolved therein, and a porous film used as a separator. A nonaqueous solvent having a low viscosity and a low boiling point is used as the solvent of the electrolyte.

Jpn. Pat. Appln. KOKAI Publication No. 4-14769 discloses an organic solvent containing as a main component a mixed solvent consisting of propylene carbonate, ethylene carbonate and γ-butyrolactone. It is taught that it is possible to improve the low temperature discharge characteristics of a cylindrical nonaqueous electrolyte secondary battery by using a nonaqueous electrolyte prepared by using the mixed solvent noted above, which contains 10 to 50% by volume of γ-butyrolactone.

However, the lithium ion secondary battery comprising a nonaqueous electrolyte disclosed in Jpn. Pat. Appln. KOKAI Publication No. 4-14769 quote above gives rise problems. Specifically, a large amount of gas is generated from the negative electrode in the initial charging step. Alternatively, where the lithium ion secondary battery is stored under very high temperatures not lower than 60° C., the positive electrode reacts with the nonaqueous electrolyte so as to decompose the nonaqueous electrolyte by oxidation, thereby bringing about a gas generation. It follows that, if the wall thickness of the case housing the positive electrode, the negative electrode, the separator and the nonaqueous electrolyte is decreased in order to decrease the thickness of secondary battery, the case is swollen by the generated gas so as to be deformed. If the case is deformed, the secondary battery fails to be incorporated in an electronic apparatus or tends to bring about a malfunction of the electronic apparatus. Further, the lithium ion secondary battery gives rise to additional problems that the self-discharge tends to proceed under a high temperature environment, and that the secondary battery is not satisfactory in respect of the charge-discharge cycle life characteristics.

On the other hand, Jpn. Pat. Appln. KOKAI Publication No. 11-97062 teaches a nonaqueous electrolyte prepared by dissolving lithium borofluoride ($LiBF_4$) in a solvent containing 100% by volume of γ-butyrolactone. It is taught that use of the particular nonaqueous electrolyte makes it possible to prevent the positive electrode containing a lithium cobalt composite oxide as an active material from being oxidized and decomposed by the nonaqueous electrolyte.

Also, a lithium ion polymer secondary battery comprising a polymer gel electrolyte is reported on pate 23 of "Summaries of Lectures in $67^{th}$ Meeting of Electrochemical Society (published on Mar. 28, 2000). The polymer gel electrolyte is manufactured as follows. Specifically, ethylene carbonate and γ-butyrolactone are mixed first at a volute ratio of 2:3 so as to prepare a mixed solvent, followed by dissolving $LiBF_4$ or $LiPF_6$ as a salt in the resultant mixed solvent so as to obtain an electrolyte. Further, a mixed solution consisting of the electrolyte thus obtained and a polyfunctional acrylate monomer is polymerized, followed by bringing about a chemical crosslinking reaction within the polymer thus obtained so as to obtain the polymer gel electrolyte.

However, in the secondary battery disclosed in Jpn. Pat. Appln. KOKAI Publication No. 11-97062 and reported in the literature quoted above, the electrolyte or the gel electrolyte tends to react with the negative electrode so as to be reduced and decomposed, with the result that a current concentration tends to take place in the negative electrode. It follows that problems are brought about that the lithium metal is precipitated on the surface of the negative electrode, that the impedance is increased in the interface of the negative electrode, and that the charge-discharge efficiency of the negative electrode is lowered so as to lower the charge-discharge cycle characteristics.

Further, Jpn. Pat. Appln. KOKAI Publication No. 2000-235868 is directed to a nonaqueous electrolyte secondary battery using a nonaqueous electrolyte containing a nonaqueous solvent and a lithium salt dissolved in the nonaqueous solvent. This prior art teaches that the nonaqueous solvent includes γ-butyrolactone (BL), ethylene carbonate (EC) and at least one kind of a third solvent selected from the group consisting of propylene carbonate (PC), vinylene carbonate (VC), trifluoro propylene, diethyl carbonate (DEC), ethyl methyl carbonate (EMC) and an aromatic compound, the amount of γ-butyrolactone being larger than 50% by volume and not larger than 95% by volume.

This prior art also teaches that, if the ratio of at least one kind of the solvent selected from DEC, MEC, PC and VC exceeds 10% by volume based on the entire nonaqueous solvent, it is difficult to suppress sufficiently the decomposition of the nonaqueous electrolyte by oxidation under a high temperature environment. Alternatively, it is also taught that the viscosity of the nonaqueous electrolyte is increased so as to make it possible for the ionic conductivity to be lowered. Such being the situation, this prior art teaches that it is desirable for the volume ratio of at least one kind of the solvent selected from the group consisting of DEC, MEC, PC and VC to be not higher than 10% by volume based on the entire nonaqueous solvent.

However, the secondary battery disclosed in Jpn. Pat. Appln. KOKAI Publication No. 2000-235868 is defective in that it is difficult to obtain a long charge-discharge cycle life under a high temperature environment.

BRIEF SUMMARY OF THE INVENTION

An object of the present invention is to provide a nonaqueous electrolyte and a nonaqueous electrolyte secondary battery capable of improving the charge-discharge cycle characteristics.

According to a first aspect of the present invention, there is provided a nonaqueous electrolyte comprising a nonaqueous solvent and a solute dissolved in the nonaqueous solvent, wherein:

the nonaqueous solvent contains ethylene carbonate (EC), propylene carbonate (PC), γ-butyrolactone (BL), and a fourth component, which is a solvent other than the EC, PC and BL; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio p (% by volume) of the fourth component based on the total amount of the nonaqueous solvent is larger than 0 and is not larger than 5, i.e., $0 \leq p \leq 5$.

According to a second aspect of the present invention, there is provided a nonaqueous electrolyte comprising a nonaqueous solvent and a solute dissolved in the nonaqueous solvent, wherein:

the nonaqueous solvent contains ethylene carbonate (EC), propylene carbonate (PC), γ-butyrolactone (BL), vinylene carbonate (VC) and a fifth component, which is a solvent other than the EC, PC, BL and VC; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, the mixing ratio w (% by volume) of vinylene carbonate based on the total amount of the nonaqueous solvent is larger than 0 and is not larger than 5, i.e., $0 < w \leq 5$, and the mixing ratio q (% by volume) of the fifth component based on the total amount of the nonaqueous solvent is larger than 0 and is not larger than 5, i.e., $0 < q \leq 5$.

According to a third aspect of the present invention, there is provided a nonaqueous electrolyte secondary battery, comprising a case having a wall thickness not larger than 0.3 mm, an electrode group provided in the case, and a nonaqueous electrolyte provided in the case, and the nonaqueous electrolyte containing a nonaqueous solvent and a solute dissolved in the nonaqueous solvent, wherein:

the nonaqueous solvent contains ethylene carbonate (EC), propylene carbonate (PC), γ-butyrolactone (BL), and a fourth component, which is a solvent other than the EC, PC and BL; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio p (% by volume) of the fourth component based on the total amount of the nonaqueous solvent is larger than 0 and is not larger than 5, i.e., $0 < p \leq 5$.

According to a fourth aspect of the present invention, there is provided a nonaqueous electrolyte secondary battery, comprising a case having a wall thickness not larger than 0.3 mm, a positive electrode provided in the case, a negative electrode provided in the case, and an electrolyte layer arranged between the positive electrode and the negative electrode, and the electrolyte layer containing a nonaqueous electrolyte and a polymer for gelling the nonaqueous electrolyte, wherein:

the nonaqueous solvent contains ethylene carbonate (EC), propylene carbonate (PC), γ-butyrolactone (BL), and a fourth component, which is a solvent other than the EC, PC and BL; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio p (% by volume) of the fourth component based on the total amount of the nonaqueous solvent is larger than 0 and is not larger than 5, i.e., $0 < p \leq 5$.

According to a fifth aspect of the present invention, there is provided a nonaqueous electrolyte secondary battery, comprising a case having a wall thickness not larger than 0.3 mm, an electrode group provided in the case, and a nonaqueous electrolyte provided in the case, and the nonaqueous electrolyte containing a nonaqueous solvent and a solute dissolved in the nonaqueous solvent, wherein:

the nonaqueous solvent contains ethylene carbonate (EC), propylene carbonate (PC), γ-butyrolactone (BL), vinylene carbonate (VC) and a fifth component, which is a solvent other than the EC, PC, BL and VC; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, the mixing ratio w (% by volume) of vinylene carbonate based on the total amount of the nonaqueous solvent is larger than 0 and is not larger than 5, i.e., $0 < w \leq 5$, and the mixing ratio q (% by volume) of the fifth component based on the total amount of the nonaqueous solvent is larger than 0 and is not larger than 5, i.e., $0 < q \leq 5$.

According to a sixth aspect of the present invention, there is provided a nonaqueous electrolyte secondary battery, comprising a case having a wall thickness not larger than 0.3 mm, a positive electrode provided in the case, a negative electrode provided in the case, and an electrolyte layer arranged between the positive electrode and the negative electrode, and the electrolyte layer containing a nonaqueous electrolyte and a polymer for gelling the nonaqueous electrolyte, wherein:

the nonaqueous solvent contains ethylene carbonate (EC), propylene carbonate (PC), γ-butyrolactone (BL), vinylene carbonate (VC) and a fifth component, which is a solvent other than the EC, PC, BL and VC; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, the mixing ratio w (% by volume) of vinylene carbonate based on the total amount of the nonaqueous solvent is larger than 0 and is not larger than 5, i.e., $0 < w \leq 5$, and the mixing ratio q (% by volume) of the fifth component based on the total amount of the nonaqueous solvent is larger than 0 and is not larger than 5, i.e., $0 < q \leq 5$.

According to a seventh aspect of the present invention, there is provided a nonaqueous electrolyte secondary battery, comprising a case having a wall thickness not larger than 0.3 mm, a positive electrode provided in the case and capable of absorbing-desorbing lithium ions, a negative electrode provided in the case and capable of absorbing-desorbing lithium ions, a separator arranged between the positive electrode and the negative electrode, and a liquid nonaqueous electrolyte impregnated in at least the separator, and the liquid nonaqueous electrolyte containing a nonaqueous solvent and a solute dissolved in the nonaqueous solvent, wherein:

the nonaqueous solvent contains ethylene carbonate, propylene carbonate, γ-butyrolactone, and vinylene carbonate; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio w (% by volume) of vinylene carbonate based on the total amount of the nonaqueous solvent falls within a range of between 0.05 and 5, i.e., $0.05 \leq w \leq 5$.

Further, according to an eighth aspect of the present invention, there is provided a nonaqueous electrolyte secondary battery, comprising a case having a wall thickness not larger than 0.3 mm, a positive electrode provided in the case and capable of absorbing-desorbing lithium ions, a negative electrode provided in the case and capable of absorbing-desorbing lithium ions, and an electrolyte layer arranged between the positive electrode and the negative electrode, and the electrolyte layer containing a nonaqueous solvent and a solute dissolved in the nonaqueous solvent, wherein:

the nonaqueous solvent contains ethylene carbonate, propylene carbonate, γ-butyrolactone, and vinylene carbonate; and the mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio w (% by volume) of vinylene carbonate based on the total amount of the nonaqueous solvent falls within a range of between 0.05 and 5, i.e., $0.05 \leq w \leq 5$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawing, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
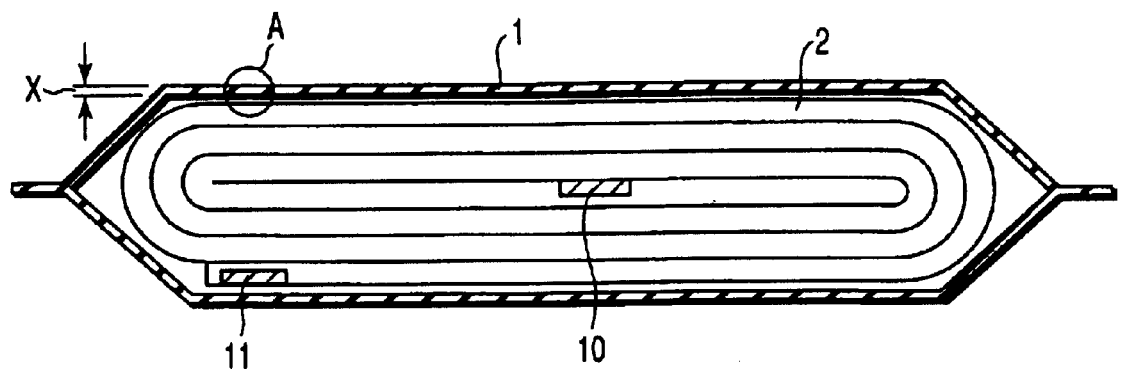
FIG. 1 is a cross sectional view showing a thin type lithium ion secondary battery as an example of the nonaqueous electrolyte secondary battery according to the present invention.

The nonaqueous electrolyte secondary battery of the present invention comprises a case having a wall thickness not larger than 0.3 mm, an electrode group housed in the case, and a nonaqueous electrolyte held by the electrode group. The nonaqueous electrolyte contains a nonaqueous solvent and a lithium salt dissolved in the nonaqueous solvent.

The nonaqueous solvent used in the present invention includes nonaqueous solvents A to C given below:

(A) Nonaqueous Solvent A

The nonaqueous solvent A used in the present invention includes ethylene carbonate, propylene carbonate, γ-butyrolactone and a fourth component. The fourth component includes at least one kind of solvent selected from the group consisting of vinylene carbonate, vinylethylene carbonate, ethylene sulfite, phenylethylene carbonate, 12-crown-4 and tetraethylene glycol dimethyl ether.

The mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio p (% by volume) of the fourth component based on the total amount of the nonaqueous solvent is larger than 0 and is not larger than 5, i.e., $0 < p \leq 5$.

(B) Nonaqueous Solvent B

The nonaqueous solvent B includes ethylene carbonate, propylene carbonate, γ-butyrolactone and vinylene carbonate. The mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio w (% by volume) of vinylene carbonate based on the total amount of the nonaqueous solvent falls within a range of between 0.05 and 5, i.e., $0.05 \leq w \leq 5$. It is desirable for the mixing ratio y of propylene carbonate to be between 2% by volume and 30% by volume, and it is desirable for the mixing ratio Z or γ-butyrolactone to be between 35% by volume and 85% by volume.

(C) Nonaqueous Solvent C

The nonaqueous solvent C includes ethylene carbonate, propylene carbonate, γ-butyrolactone, vinylene carbonate and a fifth component. The fifth component includes at least one solvent selected from the group consisting of vinylethylene carbonate, ethylene sulfite, phenylethylene carbonate, 12-crwon-4 and tetraethylene glycol dimethyl ether.

The mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, the mixing ratio w of vinylene carbonate based on the total amount of the nonaqueous solvent is larger than 0 and is not larger than 5, i.e., $0 < w \leq 5$, and the mixing ratio q (% by volume) of the fifth component based on the total amount of the nonaqueous solvent is larger than 0 and not larger than 5, i.e., $0 < q \leq 5$.

It is possible to use the nonaqueous electrolyte, which is substantially in the form of a liquid or in the form of a gel. Particularly, it is desirable to use a liquid nonaqueous electrolyte. By using a liquid nonaqueous electrolyte, it is possible to increase the ionic conductivity and to decrease the interface resistance between the positive electrode and the separator and the interface resistance between the negative electrode and the separator.

The nonaqueous electrolyte can be formed by, for example, any of methods (I) to (IV) given below:

(I) A liquid nonaqueous electrolyte is obtained by dissolving a lithium salt in any of the nonaqueous solvents A to C given above.

(II) A paste prepared by mixing a lithium salt and a polymer with any of the nonaqueous solvents A to C given above is formed into a thin film, followed by drying the thin film. Then, an electrode group is prepared by interposing the resultant thin film between a positive electrode and a negative electrode. The electrode group thus prepared is impregnated with a liquid nonaqueous electrode, followed by plasticizing the thin film under a reduced pressure.

(III) A separator is impregnated with a slurry containing any one of the nonaqueous solvents A to C given above, a lithium salt and a gelling agent, followed by interposing the separator between a positive electrode and a negative electrode so as to obtain an electrode group holding a gel-like nonaqueous electrolyte.

(IV) A positive electrode or a negative electrode is coated with a slurry containing any one of the nonaqueous solvents A to C given above, a lithium salt and a gelling agent, followed by interposing a separator between the positive electrode and the negative electrode so as to obtain an electrode group holding a gel-like nonaqueous electrolyte.

It is possible to use, for example, polyacrylonitrile (PAN) as the gelling agent noted above.

Specific examples of the secondary batteries according to the present invention, i.e., nonaqueous electrolyte secondary battery (I) and nonaqueous electrolyte secondary battery (II), will now be described.

1. Nonaqueous Electrolyte Secondary Battery (I)

The nonaqueous electrolyte secondary battery (I) comprises a case substantially formed of a sheet material having a thickness not larger than 0.3 mm, an electrode group housed in the case. The electrode group includes a positive electrode capable of absorbing-desorbing lithium ions, a negative electrode capable of absorbing-desorbing lithium ions, and a separator arranged between the positive electrode and the negative electrode. The secondary battery (I) further comprises a liquid nonaqueous electrolyte impregnated in at least the separator and containing a nonaqueous solvent and a lithium salt dissolved in the nonaqueous solvent.

Each of the electrode group, the positive electrode, the negative electrode, the nonaqueous electrolyte and the case referred to above will now be described.

1) Electrode Group

In the electrode group, it is desirable for the positive electrode, the negative electrode and the separator to be made integral. The electrode group of the particular construction can be prepared by any of the methods (i) to (ii) given below:

(i) A laminate structure including a positive electrode, a negative electrode, and a separator interposed between the positive electrode and the negative electrode is wound in a flat shape so as to prepare a flattened laminate body, or the laminate structure noted above is spirally wound, followed by compressing the wound structure in the radial direction so as to prepare a flattened laminate body. Alternatively, the laminate structure noted above is folded at least once so as to prepare a flattened laminate body. Then, a heat molding is applied to the flattened laminate body in the direction of the lamination so as to thermally cure the binder contained in the positive electrode and the negative electrode, thereby obtaining an electrode group in which the positive electrode, the negative electrode and the separator are integral.

It is possible to apply the heat molding after or before the flattened laminate body is housed in the case. It is desirable to apply the heat molding under a reduced pressure atmosphere including vacuum or under an atmospheric pressure. The molding can be performed by, for example, a press molding or loading in a molding mold. It is desirable for the temperature in the heat molding step to fall within a range of between 20° C. and 120° C., preferably between 60° C. and 100° C. Further, it is desirable for the pressure in the heat molding step to fall within a range of between 0.01 and 35 kg/cm$^2$, preferably between 8 and 30 kg/cm$^2$, and most preferably between 12 and 25 kg/cm$^2$.

(ii) A laminate structure including a positive electrode, a negative electrode, and a separator interposed between the positive electrode and the negative electrode is wound in a flat shape so as to prepare a flattened laminate body, or the laminate structure noted above is spirally wound, followed by compressing the wound structure in the radial direction so as to prepare a flattened laminate body. Alternatively, the laminate structure noted above is folded at least once so as to prepare a flattened laminate body. Then, the flattened laminate body thus obtained is impregnated with a solution of a polymer having an adhesivity, followed by applying a vacuum drying so as to evaporate the solvent of the solution.

Then, a heat molding is applied so as to make the positive electrode, the negative electrode and the separator integral, thereby obtaining an electrode group. In the electrode group thus obtained, the positive electrode and the separator are made integral by the adhesive polymer dotted inside and at the boundary between the positive electrode and the separator. Likewise, the negative electrode and the separator are made integral by the adhesive polymer dotted inside and at the boundary between the negative electrode and the separator. It follows that it is possible to increase the bonding strength between the electrode and the separator while suppressing the internal resistance of the secondary battery at a low level.

It is possible to apply the heat molding before or after the flattened laminate body is housed in the case. Also, the solution of the adhesive polymer can be prepared by dissolving the adhesive polymer in an organic solvent.

It is desirable for the adhesive polymer to be capable of maintaining a high adhesivity under the state of holding the nonaqueous electrolyte. It is more desirable for the adhesive polymer to exhibit a high ionic conductivity. To be more specific, the adhesive polymer used in the present invention includes, for example, polyacrylonitrile (PAN), polyacrylate (PMMA), polyvinylidene fluoride (PVdF), polyvinyl chloride (PVC) and polyethylene oxide (PEO). It is particularly desirable to use polyvinylidene fluoride as the adhesive polymer. Polyvinylidene fluoride is capable of holding the nonaqueous electrolyte and is partially gelled when the nonaqueous electrolyte is contained therein so as to further improve the ionic conductivity.

It is desirable for the solvent to have a melting point not higher than 200° C., preferably not higher than 180° C. On the other hand, it is desirable for the lower limit in the melting point of the solvent to be 50° C., preferably 100° C.

It is desirable for the concentration of the adhesive polymer contained in the solution to fall within a range of between 0.05 and 2.5% by weight, preferably between 0.1 and 1.5% by weight.

Where the concentration of the adhesive polymer falls within a range of between 0.05 and 2.5% by weight, it is desirable for the pouring amount of the solution to fall within a range of between 0.1 and 2 ml per 100 mAh of the battery capacity, preferably between 0.15 and 1 ml per 100 mAh of the battery capacity.

It is desirable to carry out the vacuum drying under temperatures not higher than 100° C., preferably between 40° C. and 100° C.

It is desirable for the total amount of the adhesive polymer contained in the battery to fall within a range of between 0.1 and 6 mg per 100 mAh of the battery capacity, preferably between 0.2 and 1 mg per 100 mAh of the battery capacity.

2) Positive Electrode

The positive electrode comprises a current collector and a positive electrode layer containing an active material, the positive electrode layer being formed on one surface or both surfaces of a current collector.

The positive electrode layer contains a positive electrode active material, a binder and a conductive agent.

The positive electrode active material includes various oxides such as manganese oxide, lithium manganese complex oxide, lithium-containing nickel oxide, lithium-containing cobalt oxide, lithium-containing nickel cobalt oxide, lithium-containing iron oxide, lithium-containing vanadium oxide, and chalcogen compounds such as titanium disulfide and molybdenum disulfide. Particularly, it is desirable to use lithium-containing cobalt oxide (e.g., $LiCoO_2$), lithium-containing nickel cobalt oxide (e.g., $LiNi_{0.8}Co_{0.2}O_2$), and lithium manganese complex oxide (e.g., $LiMn_2O_4$, $LiMnO_2$), because it is possible to obtain a high voltage in the case using these materials as the positive electrode active material.

The conductive agent used in the present invention includes, for example, acetylene black, carbon black, graphite, etc.

The binder serves to allow the active material to be held by the current collector and to allow the active material particles to be joined to each other. The binder used in the present invention includes, for example, polytetrafluoroethylene (PTFE), polyvinylidene fluoride (PVdF), ethylene-propylene-diene copolymer (EPDM), and styrene-butadiene rubber (SBR).

It is desirable for the positive electrode active material to be mixed in amount of 80 to 95% by weight. It is desirable for the conductive agent to be mixed in an amount of 3 to 20% by weight. Further, it is desirable for the binder to be mixed in an amount of 2 to 7% by weight.

It is possible to use a porous conductive substrate or a nonporous conductive substrate as the current collector. It is possible for each of these porous and nonporous substrates to be formed of, for example, aluminum, stainless steel or nickel.

It is desirable to use a conductive substrate having a two dimensional porous structure having at least one pore having a diameter not larger than 3 mm per 10 $cm^2$ of the conductive substrate. It is more desirable for the diameter of the pore to fall within a range of between 0.1 mm and 1 mm. Also, it is desirable for 10 to 20 pores to be present per 10 $cm^2$ of the conductive substrate.

It is desirable for the conductive substrate having a two dimensional porous structure, in which at least one pore having a diameter not larger than 3 mm is present per 10 $cm^2$ of the conductive substrate, to have a thickness falling within a range of between 15 and 100 $\mu$m, preferably between 30 and 80 $\mu$m.

The positive electrode can be prepared by, for example, suspending the positive electrode active material, the conductive agent and the binder in a suitable solvent, followed by coating the current collector with the resultant suspension, and subsequently drying the coated current collector, and pressing the coated current collector.

Where the electrode group is prepared by method (ii) described above, the positive electrode further contains the adhesive polymer.

3) Negative Electrode

The negative electrode comprises a current collector and a negative electrode layer formed on one surface or both surfaces of the current collector.

The negative electrode layer contains a carbonaceous material capable of absorbing-desorbing lithium ions and a binder.

The carbonaceous material used in the present invention includes, for example, a graphitized material and carbon material such as graphite, coke, carbon fiber and spherical carbon; or a graphitized material and a carbon material obtained by heat-treating a thermosetting resin, isotropic pitch, mesophase pitch, mesophase pitch-based carbon fibers, vapor-grown-carbon fiber or mesophase globules at a temperature of 500 to 3,000° C., the mesophase pitch based carbon fiber being particularly desirable because the capacity and the charge-discharge cycle characteristics can be improved. Particularly, it is desirable to use a graphitized material obtained by setting the temperature for the heat treatment at 2,000° C. or more and having an average layer spacing $d_{002}$ derived from (002) reflection of 0.34 nm or less. The battery capacity and the large current discharge characteristics can be markedly improved in the nonaqueous electrolyte secondary battery comprising the negative electrode containing the particular graphitized material as the carbonaceous material. It is more desirable for the average layer spacing $d_{002}$ to be not larger than 0.336 nm.

The binder used in the present invention includes, for example, polytetrafluoroethylene (PTFE), polyvinylidene fluoride (PVdF), ethylene-propylene-diene copolymer (EPDM), styrene-butadiene rubber (SBR), and carboxy methyl cellulose (CMC).

It is desirable for the carbonaceous material to be mixed in an amount of 90 to 98% by weight. Also, it is desirable for the binder to be mixed in an amount of 2 to 20% by weight.

It is possible to use a porous conductive substrate or a nonporous conductive substrate as the current collector. It is possible for each of these porous and nonporous substrates to be formed of, for example, copper, stainless steel or nickel.

It is desirable to use a conductive substrate having a two dimensional porous structure having at least one pore having a diameter not larger than 3 mm per 10 $cm^2$ of the conductive substrate. It is more desirable for the diameter of the pore to fall within a range of between 0.1 mm and 1 mm. Also, it is desirable for 10 to 20 pores to be present per 10 $cm^2$ of the conductive substrate.

It is desirable for the conductive substrate having a two dimensional porous structure, in which at least one pore having a diameter not larger than 3 mm is present per 10 $cm^2$ of the conductive substrate, to have a thickness falling within a range of between 10 and 50 $\mu m$.

The negative electrode can be prepared by, for example, kneading a carbonaceous material capable of absorbing-desorbing lithium ions and a binder in the presence of a solvent, followed by coating a current collector with the resultant kneaded material and subsequently drying the coated current collector and applying a single pressing treatment or a multi-stage pressing including 2 to 5 times of the pressing under a desired pressure.

Where the electrode group is prepared by the method (ii) described previously, the negative electrode further contains the adhesive polymer.

As described above, the negative electrode layer contains a carbonaceous material capable of absorbing-desorbing lithium ions. It is also possible for the negative electrode layer to contain a metal such as aluminum, magnesium, tin or silicon, a metal compound such as a metal oxide, a metal sulfide or a metal nitride, or a lithium alloy.

The metal oxides that are contained in the negative electrode layer include, for example, tin oxide, silicon oxide, lithium titanium oxide, niobium oxide, and tungsten oxide. The metal sulfides contained in the negative electrode layer include, for example, tin sulfide and titanium sulfide. The metal nitrides contained in the negative electrode layer include, for example, lithium cobalt nitride, lithium iron nitride and lithium manganese nitride. Further, the lithium alloys contained in the negative electrode layer include, for example, a lithium-aluminum alloy, a lithium-tin alloy, a lithium-lead alloy and a lithium-silicon alloy.

4) Separator

The separator is substantially formed of a porous sheet.

It is possible to use, for example, a porous film or an unwoven fabric as the porous sheet acting as the separator. It is desirable for the porous sheet to be formed of at least one kind of material selected from the group consisting of polyolefin and cellulose. The polyolefin used in the present invention includes, for example, polyethylene and polypropylene. Particularly, it is desirable to use a porous film containing polyethylene, polypropylene or both polyethylene and polypropylene in order to improve the safety of the secondary battery.

It is desirable for the porous sheet to have a thickness not larger than 30 $\mu m$, more desirably not larger than 25 $\mu m$. On the other hand, the lower limit in the thickness of the porous sheet should desirably be 5 $\mu m$, more desirably 8 $\mu m$.

It is desirable for the porous sheet to have a thermal shrinkage not larger than 20% at 120° C. for 1 hour. It is more desirable for the thermal shrinkage of the porous sheet to be not larger than 15% at 120° C. for 1 hour.

It is desirable for the porous sheet to have a porosity falling within a range of between 30% and 60%, more desirably between 35% and 50%.

It is desirable for the porous sheet to have an air permeability not higher than 600 seconds/100 $cm^3$. The air permeability denotes the time (seconds) required for 100 $cm^2$ of the air to pass through the porous sheet. The upper limit of the air By permeability should more desirably be set at 500 seconds/100 $cm^3$. On the other hand, the lower limit of the air permeability should desirably be set at 50 seconds/100 $cm^3$ and more desirably at 80 seconds/100 $cm^3$.

Where the electrode group is prepared by the method (ii) described previously, the separator further contains an adhesive polymer.

5) Liquid Nonaqueous Electrolyte

The liquid nonaqueous electrolyte contain a nonaqueous solvent and a lithium salt dissolved in the nonaqueous solvent.

Any of the nonaqueous solvents (A) to (C) described previously can be used for preparing the liquid nonaqueous electrolyte. The nonaqueous solvent (A) will now be described first.

a. γ-butyrolactone (BL)

The mixing ratio z of BL should be between 30% by volume and 85% by volume based on the total amount of the nonaqueous solvent. If the mixing ratio z of BL is lower than 30% by volume, a gas tends to be generated under a high temperature. Also, if the mixing ratio z of BL is lower than 30% by volume, the ratio of EC or PC, which are cyclic carbonates, is rendered relatively high so as to markedly increase the viscosity of the solvent. As a result, the conductivity and the permeability of the liquid nonaqueous electrolyte are markedly lowered so as to make it difficult to improve the charge-discharge cycle characteristics and the discharge characteristics under a low temperature environment of about −20° C. On the other hand, if the mixing ratio of BL is higher than 85% by volume, the reaction between the negative electrode and BL is promoted so as to make it difficult to improve the charge-discharge cycle characteristics. To be more specific, if the nonaqueous electrolyte is decomposed by the reduction between BL and the negative electrode, which contains, for example, a carbonaceous material capable of absorbing-desorbing lithium ions, a film inhibiting the charge-discharge reaction is formed on the surface of the negative electrode. As a result, a current concentration tends to take place in the negative electrode so as to cause precipitation of the lithium metal on the surface of the negative electrode. Alternatively, an impedance is increased on the surface of the negative electrode so as to lower the charge-discharge efficiency of the negative electrode and, thus, to lower the charge-discharge cycle characteristics. The mixing ratio of BL should preferably fall within a range of between 35% by volume and 85% by volume, more preferably between 35% by volume and 75% by volume, and most preferably between 55% by volume and 75% by volume.

b. Ethylene Carbonate (EC)

The mixing ratio x of EC based on the total amount of the nonaqueous solvent should be between 15% by volume and 50% by volume. If the mixing ratio x of EC is lower than 15% by volume, it is difficult to cover the surface of the negative electrode with a protective film, with the result that the reaction between the negative electrode and BL proceeds so as to make it difficult to improve sufficiently the charge-discharge cycle characteristics. On the other hand, if the mixing ratio x of EC exceeds 50% by volume, the viscosity of the liquid nonaqueous electrolyte is increased and, thus, the ionic conductivity tends to be lowered. It follows that it is difficult to improve sufficiently the charge-discharge cycle characteristics. It is more desirable for the mixing ratio x of EC to fall within a range of between 20% by volume and 50% by volume, and further more desirably between 20% by volume and 40% by volume.

c. Propylene Carbonate (PC)

The mixing ratio y of propylene carbonate based on the total amount of the nonaqueous electrolyte should be between 2% by volume and 35% by volume. If the mixing ratio y of propylene carbonate is lower than 2% by volume, it is difficult to densify the protective film on the surface of the negative electrode, with the result that the reaction between the negative electrode and BL tends to be promoted so as to make it difficult to improve sufficiently the charge-discharge cycle characteristics. On the other hand, if the mixing ratio y of PC exceeds 35% by volume, the gas generation is rendered prominent during storage under high temperatures and in the initial charging step. As a result, the case is swollen so as to give rise to the problem that the secondary battery fails to be incorporated in the case package or in the electronic apparatus. Also, if a gas is generated in the initial charging step, the initial charging efficiency is lowered so as to impair the entire battery characteristics such as the discharge capacity. Also, in order to further decrease the gas generation amount, it is desirable to control the upper limit of the PC mixing ratio y to be 30% by volume, more preferably 25% by volume, and most preferably 20% by volume.

It is more desirable for the mixing ratio y of PC to fall within a range of larger than 10% by volume and not larger than 35% by volume. If the mixing ratio y of PC is not higher than 10% by volume, the cycle life tends to be shortened under a very high temperature such as 60° C. If the mixing ratio y of PC falls within a range of between larger than 10% by volume and not larger than 35% by volume, the cycle life is prolonged even under a very high temperature such as 60° C. The particular effect is considered to be derived from the mechanism described in the following.

Specifically, γ-butyrolactone (BL) tends to react with the negative electrode and also reacts with the positive electrode when the secondary battery is fully charged. Particularly, under a very high temperature environment of 60° C., the reaction between the negative electrode and BL proceeds vigorously. On the other hand, reactivity of PC with the negative electrode is low, and also reactivity of PC with the positive electrode when the secondary battery is fully charged is low. Further, PC is capable of forming a dense protective film excellent in the lithium permeability in the presence of BL, EC and the fourth component. It follows that, if the mixing ratio of PC based on the total amount of the nonaqueous solvent exceeds 10% by volume, it is possible to suppress the reactivity of the solvent itself with the positive and negative electrodes to a low level and to form a high quality protective film on the surface of the negative electrode. Such being the situation, it is considered reasonable to understand that the reaction between the negative electrode and BL is suppressed so as to improve the charge-discharge cycle life under a very high temperature environment such as 60° C. Incidentally, if one of vinylene carbonate (VC) and vinylethylene carbonate (VEC) is contained as the fourth component of the nonaqueous solvent, it is possible to improve the heat stability of the protective film and to suppress the reactivity of the negative electrode with the nonaqueous solvent so as to further improve the charge-discharge cycle characteristics at 60° C.

Also, in order to further decrease the gas generation amount during the storage of the secondary battery under high temperatures and in the initial charging step of the secondary battery while ensuring the charge-discharge cycle life under a very high temperature environment such as 60° C., it is desirable to control the PC mixing ratio y to fall within a range of between larger than 10% by volume and not larger than 35% by volume, more preferably between larger than 10% by volume and not larger than 25% by volume, and most preferably between larger than 10% by volume and not larger than 20% by volume.

Incidentally, PC is migrated from the nonaqueous solvent onto the surface of the negative electrode during the initial charge-discharge step so as to be attached to the surface of the negative electrode. Therefore, in the secondary battery subjected to the initial charge-discharge step, the mixing ratio of PC based on the total amount of the nonaqueous solvent is rendered smaller than that before assembly of the secondary battery. The rate of reduction in the PC mixing ratio is increased with decrease in the addition amount of PC.

d. Fourth Component

The mixing ratio p of the fourth component of the nonaqueous solvent should not exceed 5% by volume based on the total amount of the nonaqueous solvent. If the mixing ratio p of the fourth component exceeds 5% by volume, the gas generation tends to be rendered prominent during storage of the secondary battery under high temperatures and in the initial charging step. Alternatively, the lithium ion permeability through the protective film formed on the surface of the negative electrode tends to be lowered so as to increase the impedance of the negative electrode so as to make it difficult to obtain excellent charge-discharge cycle characteristics and excellent discharge characteristics under low temperatures. It should also be noted that, if the mixing ratio p of the fourth component is lower than 0.05% by volume based on the total amount of the nonaqueous solvent, the density and the lithium ion permeability of the protective film formed on the surface of the negative electrode tend to be impaired. As a result, it is difficult to improve sufficiently the charge-discharge cycle characteristics and the discharge characteristics under low temperatures. Alternatively, there is a possibility that it is impossible to suppress the self-discharge during storage of the secondary battery under high temperatures. Such being the situation, it is desirable for the mixing ratio p of the fourth component of the nonaqueous solvent to fall within a range of between 0.05% by volume and 5% by volume.

Where vinylethylene carbonate (VEC) is used as the fourth component of the nonaqueous solvent, it is desirable for the mixing ratio p of the fourth component to fall within a range of between 0.05% by volume and 5% by volume, more desirably between 0.1% by volume and 4% by volume, and most desirably between 0.2% by volume and 3% by volume.

Where ethylene sulfite (ES) is used as the fourth component of the nonaqueous solvent, it is desirable for the mixing ratio p of the fourth component to be not larger than 5% by volume, more desirably not larger than 3% by volume, and most desirably not larger than 1.5% by volume.

Where phenylethylene carbonate (phEC) is used as the fourth component of the nonaqueous solvent, it is desirable for the mixing ratio p of the fourth component to be not larger than 5% by volume, more desirably not larger than 4% by volume, and most desirably not larger than 3% by volume.

Where 12-crown-4 (Crown) is used as the fourth component of the nonaqueous solvent, it is desirable for the mixing ratio p of the fourth component to be not larger than 5% by volume, more desirably not larger than 4% by volume, and most desirably not larger than 3% by volume.

Further, where tetraethylene glycol dimethyl ether (Ether) is used as the fourth component of the nonaqueous solvent, it is desirable for the mixing ratio p of the fourth component to be not larger than 5% by volume, more desirably not larger than 4% by volume, and most desirably not larger than 3% by volume.

It is desirable to use vinylene carbonate (VC), vinylethylene carbonate (VEC), phenylethylene carbonate (phEC), and ethylene sulfite (ES) as the fourth component of the nonaqueous solvent used in the present invention. It is particularly desirable to use vinylene carbonate (VC) and vinylethylene carbonate (VEC) as the fourth component.

It is also possible to use as the fourth component solvents other than VC, VEC, ES, phEC, Crown and Ether.

The other solvents noted above include, for example, diethyl carbonate (DEC), dimethyl carbonate (DMC), ethyl methyl carbonate (EMC), γ-valerolactone (VL), methyl propionate (MP), ethyl propionate (EP), 2-methylfuran (2Me-F), furan (F), thiophene (TIOP) and catechol carbonate (CATC). These other solvents used as the fourth component of the nonaqueous solvent of the present invention can be used singly or in the form of a mixture of a plurality of these other solvents.

Particularly, in the case of using the fourth component including at least one kind of a solvent (solvent X) selected from the group consisting of VC, VEC, ES, phEC, Crown and Ether and at least one kind of a solvent (solvent Y) selected from the group consisting of DEC, DMC, EMC, VL, MP, EP, 2Me-F, F, TIOP and CATC, it is possible to further improve the charge-discharge cycle life of the secondary battery under a high temperature such as 45° C.

The nonaqueous solvent B will now be described.

The mixing ratio of each solvent based on the total amount of the nonaqueous solvent is defined to fall within the range described previously. The reasons for the definition of the mixing ratio of each solvent contained in the nonaqueous solvent B will now be described.

a. γ-butyrolactone (BL)

The mixing ratio z of BL based on the total amount of the nonaqueous solvent is defined to fall within a range of between 30% by volume and 85% by volume, as described previously, by the reasons described previously in conjunction with the nonaqueous solvent A. It is more desirable for the mixing ratio z of BL to fall within a range of between 35% by volume and 85% by volume, furthermore desirably between 35% by volume and 75% by volume, and most desirably between 55% by volume and 75% by volume.

b. Ethylene Carbonate (EC)

The mixing ratio x of EC based on the total amount of the nonaqueous solvent is defined to fall within a range of between 15% by volume and 50% by volume, as described previously, by the reasons described previously in conjunction with the nonaqueous solvent A. It is more desirable for the mixing ratio x of EC to fall within a range of between 20% by volume and 50% by volume, and most desirably between 20% by volume and 40% by volume.

c. Propylene Carbonate (PC)

The mixing ratio y of PC based on the total amount of the nonaqueous solvent is defined to fall within a range of between 2% by volume and 35% by volume, as described previously, by the reasons described previously in conjunction with the nonaqueous solvent A. Also, in order to further decrease the gas generation amount, it is desirable to control the upper limit of the PC mixing ratio y to be 30% by volume, more preferably 25% by volume, and most preferably 20% by volume. It is more desirable for the mixing ratio y of PC to fall within a range of between larger than 10% by volume and not larger than 35% by volume. If the mixing ratio y of PC is not higher than 10% by volume, the cycle life of the secondary battery tends to be lowered under a very high temperature such as 60° C. Particularly, in order to suppress the gas generation amount during the storage of the secondary battery under high temperatures and in the initial charging step of the secondary battery while ensuring a charge-discharge cycle life under a very high temperature such as 60° C., it is desirable for the PC mixing ratio y to fall within a range of between larger than 10% by volume and not larger than 35% by volume, more desirably between larger than 10% by volume and not larger than 25% by volume, and most desirably between larger than 10% by volume and not larger than 20% by volume.

d. Vinylene Carbonate (VC)

If the mixing ratio w of VC based on the total amount of the nonaqueous solvent is lower than 0.05% by volume, it is difficult to densify the protective film formed on the surface of the negative electrode, with the result that the reaction between the negative electrode and BL proceeds so as to make it difficult to improve sufficiently the charge-discharge cycle characteristics and the discharge characteristics under low temperatures. On the other hand, if the VC mixing ratio w exceeds 5% by volume, the gas generation during the storage of the secondary battery under high temperatures and in the initial charging step tends to be rendered prominent. Also, if the VC mixing ratio w exceeds 5% by volume, it is difficult to improve sufficiently the charge-discharge cycle characteristics. It is more desirable for the mixing ratio w of VC to fall within a range of between 0.1% by volume and 3% by volume, more desirably between 0.2% by volume and 2% by volume.

It should be noted that VC is migrated from the nonaqueous solvent onto the surface of the negative electrode during the initial charge-discharge process so as to be attached to the surface of the negative electrode. It follows that, in the nonaqueous solvent present in the secondary battery after the initial charge-discharge process, the mixing ratio of VC in the entire nonaqueous solvent is lower than that before assembly of the secondary battery. The rate of reduction in the case where, for example, the VC addition amount is 1% by weight is 70 to 80%. In other words, the remaining rate is 20 to 30%.

It is possible for the nonaqueous solvent B to contain solvents other than EC, PC, BL and VC. The other solvents noted above include, for example, diethyl carbonate (DEC), dimethyl carbonate (DMC), ethyl methyl carbonate (EMC), γ-valerolactone (VL), methyl propionate (MP), ethyl propionate (EP), 2-methylfuran (2Me-F), furan (F), thiophene (TIOP), and catechol carbonate (CATC). It is possible to use these other solvents singly or in the form of a mixture of at least two of these solvents. It is possible to further improve the charge-discharge cycle life under a high temperature such as 45° C. by using at least one solvent (solvent Y) selected from the group consisting of DEC, DMC, EMC, VL, MP, EP, 2Me-F, F, TIOP and CATC. Also, in order to obtain a long charge-discharge cycle life at 45° C. without adversely affecting the storage characteristics under high temperatures, the swelling of the case, and the charge-discharge characteristics under room temperature, it is desirable for the total amount of the solvent Y and VC to be not larger than 5% by volume based on the total volume of the nonaqueous solvent.

The nonaqueous solvent C will now be described.

The mixing ratio of each solvent based on the total amount of the nonaqueous solvent is defined to fall within the range described previously. The reasons for the definition of the mixing ratio of each solvent contained in the nonaqueous solvent C will now be described.

a. γ-butyrolactone (BL)

The mixing ratio z of BL based on the total amount of the nonaqueous solvent is defined to fall within a range of between 30% by volume and 85% by volume, as described previously, by the reasons described previously in conjunction with the nonaqueous solvent A. It is more desirable for the mixing ratio z of BL to fall within a range of between 35% by volume and 85% by volume, furthermore desirably between 35% by volume and 75% by volume, and most desirably between 55% by volume and 75% by volume.

b. Ethylene Carbonate (EC)

The mixing ratio x of EC based on the total amount of the nonaqueous solvent is defined to fall within a range of between 15% by volume and 50% by volume, as described previously, by the reasons described previously in conjunction with the nonaqueous solvent A. It is more desirable for the mixing ratio x of EC to fall within a range of between 20% by volume and 50% by volume, and most desirably between 20% by volume and 40% by volume.

c. Propylene Carbonate (PC)

The mixing ratio y of PC based on the total amount of the nonaqueous solvent is defined to fall within a range of between 2% by volume and 35% by volume, as described previously, by the reasons described previously in conjunction with the nonaqueous solvent A. Also, in order to further decrease the gas generation amount, it is desirable to control the upper limit of the PC mixing ratio y to be 30% by volume, more preferably 25% by volume, and most preferably 20% by volume. It is more desirable for the mixing ratio y of PC to fall within a range of between larger than 10% by volume and not larger than 35% by volume. If the mixing ratio y of PC is not higher than 10% by volume, the cycle life of the secondary battery tends to be lowered under a very high temperature such as 60° C. Particularly, in order to suppress the gas generation amount during the storage of the secondary battery under high temperatures and in the initial charging step of the secondary battery while ensuring a charge-discharge cycle life under a very high temperature such as 60° C., it is desirable for the PC mixing ratio y to fall within a range of between larger than 10% by volume and not larger than 35% by volume, more desirably between larger than 10% by volume and not larger than 25% by volume, and most desirably between larger than 10% by volume and not larger than 20% by volume.

d. Vinylene Carbonate (VC)

If the VC mixing ratio w exceeds 5% by volume, the gas generation during the storage of the secondary battery under high temperatures and in the initial charging step tends to be rendered prominent. Also, since the lithium ion permeability of the protective film formed on the surface of the negative electrode is lowered, the impedance of the negative electrode is increased so as to make it difficult to improve sufficiently the charge-discharge cycle characteristics and the discharge characteristics under low temperatures. On the other hand, if the mixing ratio w of VC based on the total amount of the nonaqueous solvent is lower than 0.05% by volume, the density and the lithium ion permeability of the protective film formed on the surface of the negative electrode tend to be impaired, with the result that it is difficult to improve sufficiently the charge-discharge cycle characteristics and the discharge characteristics under low temperatures of the secondary battery. Alternatively, it is difficult to suppress the self-discharge during storage of the secondary battery under high temperatures. Under the circumstances, it is desirable for the mixing ratio w of VC based on the total amount of the nonaqueous solvent to fall within a range of between 0.05% by volume and 5% by volume, more desirably between 0.1% by volume and 3% by volume, and most desirably between 0.2% by volume and 2% by volume.

e. Fifth Component

If the mixing ratio q of the fifth component of the nonaqueous solvent exceeds 5% by volume, it is possible for the gas generation amount during storage of the secondary battery under high temperatures and in the initial charging step of the secondary battery to be rendered prominently large. Also, since the lithium ion permeability of the film formed on the surface of the negative electrode is lowered, the impedance of the negative electrode is increased so as to make it difficult to obtain excellent charge-discharge cycle characteristics and excellent discharge characteristics under low temperatures. On the other hand, if the mixing ratio q of the fifth component of the nonaqueous solvent is lower than 0.05% by volume, it is possible for the density and the lithium ion permeability of the protective film formed on the surface of the negative electrode to be impaired. As a result, it is difficult to improve sufficiently the charge-discharge cycle characteristics and the discharge characteristics under low temperatures. Alternatively, it is difficult to suppress the self-discharge during storage of the secondary battery under high temperatures. Such being the situation, it is desirable for the mixing ratio q of the fifth component of the nonaqueous solvent based on the total amount of the nonaqueous solvent to fall within a range of between 0.05% by volume and 5% by volume. Also, it is desirable for the sum of the mixing ratios of VC and the fifth component based on the total amount of the nonaqueous solvent to be not higher than 5% by volume.

Where vinylethylene carbonate (VEC) is used as the fifth component of the nonaqueous solvent, it is desirable for the mixing ratio q of the fifth component to fall within a range of between 0.05% by volume and 5% by volume, more desirably between 0.1% by volume and 4% by volume, and most desirably between 0.2% by volume and 3% by volume.

Where ethylene sulfite (ES) is used as the fifth component of the nonaqueous solvent, it is desirable for the mixing ratio q of the fifth component to be not larger than 5% by volume, more desirably not larger than 3% by volume, and most desirably not larger than 1.5% by volume.

Where phenylethylene carbonate (phEC) is used as the fifth component of the nonaqueous solvent, it is desirable for the mixing ratio q of the fifth component to be not larger than 5% by volume, more desirably not larger than 4% by volume, and most desirably not larger than 3% by volume.

Where 12-crown-4 (Crown) is used as the fifth component of the nonaqueous solvent, it is desirable for the mixing ratio q of the fifth component to be not larger than 5% by volume, more desirably not larger than 4% by volume, and most desirably not larger than 3% by volume.

Further, where tetraethylene glycol dimethyl ether (Ether) is used as the fifth component of the nonaqueous solvent, it is desirable for the mixing ratio q of the fifth component to be not larger than 5% by volume, more desirably not larger than 4% by volume, and most desirably not larger than 3% by volume.

Among the fifth component of the nonaqueous solvent used in the present invention, it is desirable to use phenylethylene carbonate (phEC) and vinylethylene carbonate (VEC). It is particularly desirable to use vinylethylene carbonate (VEC).

It is also possible to use as the fifth component solvents other than VEC, ES, phEC, Crown and Ether.

The other solvents noted above include, for example, diethyl carbonate (DEC), dimethyl carbonate (DMC), ethyl methyl carbonate (EMC), γ-valerolactone (VL), methyl propionate (MP), ethyl propionate (EP), 2-methylfuran (2Me-F), furan (F), thiophene (TIOP) and catechol carbonate (CATC). These other solvents used as the fifth component of the nonaqueous solvent of the present invention can be used singly or in the form of a mixture of a plurality of these other solvents.

Particularly, in the case of using the fifth component including at least one kind of a solvent (solvent X) selected from the group consisting of VEC, ES, phEC, Crown and Ether and at least one kind of a solvent (solvent Y) selected from the group consisting of DEC, DMC, EMC, VL, MP, EP, 2Me-F, F, TIOP and CATC, it is possible to further improve the charge-discharge cycle life of the secondary battery under a high temperature such as 45° C.

Among the nonaqueous solvents A to C described above, it is most desirable to use the nonaqueous solvent containing EC, PC, BL and VC. The secondary battery using the nonaqueous solvent containing EC, PC, BL and VC is most excellent in the balance among the charge-discharge cycle life characteristics under room temperature, the charge-discharge cycle characteristics under temperatures of 45° C. to 60° C., and the storage characteristics (self-discharge characteristics) under a high temperature environment.

It should also be noted that the secondary battery using a nonaqueous solvent containing EC, PC, BL and VEC is excellent in the storage characteristics under high temperatures because a protective film having a excellent thermal stability is formed on the surface of the negative electrode. In addition, by allowing the nonaqueous solvent to further contain VC, it is possible to improve the lithium permeability of the protective film so as to make the charge-discharge cycle characteristics excellent under room temperature in addition to the excellent storage characteristics under high temperatures.

On the other hand, the secondary battery using a nonaqueous solvent containing EC, PC, BL and phEC is excellent in the charge-discharge characteristics under room temperature. In addition, by allowing the nonaqueous solvent to further contain VC, it is possible to obtain excellent storage characteristics under high temperatures without impairing the charge-discharge cycle characteristics under room temperature.

It should also be noted that the secondary battery using the nonaqueous solvent containing EC, PC, BL and ES is most excellent in the balance among the charge-discharge cycle life characteristics under room temperature, the charge-discharge cycle characteristics under temperatures of 45° C. to 60° C., and the storage characteristics under a high temperature environment.

The lithium salts dissolved in each of the nonaqueous solvents A to C include, for example, lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bis-trifluoromethyl sulfonylimide lithium [$(LiN(CF_3SO_2)_2)$] and $LiN(C_2F_5SO_2)_2$. It is possible to use these lithium salts single or in the form of a mixture of at least two of these lithium salts as the solute. Particularly, it is desirable to use $LiPF_6$ or $LiBF_4$, and it is most desirable to use $LiBF_4$. Also, in the case of using a mixed salt containing at least one imide salt selected from $LiN(CF_3SO_2)_2$ and $LiN(C_2F_5SO_2)_2$ and at least one salt of $LiBF_4$ and $LiPF_6$, it is possible to further improve the cycle life under a high temperature such as 45° C. Also, since the thermal stability of the solute is improved, it is possible to further suppress the voltage drop caused by the self-discharge during storage of the secondary battery under a high temperature environment.

It is desirable for the amount of the solute dissolved in the nonaqueous solvent to fall within a range of between 0.5 and 2.5 mol/L, more desirably between 1 and 2.5 mol/L.

In order to improve the wettability of the liquid nonaqueous electrolyte with the separator, it is desirable for the nonaqueous electrolyte to contain a surfactant such as trioctyl phosphate (TOP). It is desirable for the addition amount of the surfactant to be not larger than 3%, preferably to fall within a range of between 0.1% and 1%.

It is desirable for the amount of the liquid nonaqueous electrolyte to fall within a range of between 0.25 and 0.7 g/100 mAh of the battery unit capacity, desirably between 0.3 and 0.55 g/100 mAh of the battery unit capacity.

6) Casing (Housing Container)

The case is formed essentially of a sheet material having a thickness of 0.3 mm or less. The sheet material includes, for example, a metal plate, a metal film, and a sheet containing a resin layer. Incidentally, the thickness of the sheet material is also called the wall thickness of the case.

It is possible for the case to be shaped like a circular cylinder having a bottom, a rectangular cylinder having a bottom or a bag.

It is possible for the resin layer included in the sheet noted above to be formed of, for example, polyethylene or polypropylene. It is desirable for the sheet to include a metal layer and protective layers formed integral with the metal layer on both surfaces of the metal layer. The metal layer plays the role of shielding water, and can be formed of, for example, aluminum, stainless steel, iron, copper or nickel. Particularly, it is desirable for the metal layer to be formed of aluminum because aluminum is lightweight and performs the satisfactory function of shielding water. It is possible for the metal layer to be formed of a single kind of a metal or to be formed of a plurality of different kinds of metal layers, which are made integral. The two protective layers include an inner protective layer and an outer protective layer. The outer protective layer in contact with the outside plays the role of preventing a damage done to the metal layer. The outer protective layer is formed of a single kind of a resin layer or a plurality of resin layers laminated one upon the other. On the other hand, the inner protective layer plays the role of preventing the metal layer from being corroded by the nonaqueous electrolyte. It is possible for the inner protective layer to be formed of a single kind of a resin layer or a plurality of resin layers laminated one upon the other. It is also possible to use a thermoplastic resin layer for forming the surface of the inside protective layer, i.e., the inner surface of the case.

It is possible for each of the metal plate and the metal film to be formed of, for example, iron, stainless steel, or aluminum.

The wall thickness of the case should be not larger than 0.3 mm. If the wall thickness of the case is thicker than 0.3 mm, it is impossible to obtain a high weight energy density and a high volume energy density. It is more desirable for the wall thickness of the case to be not larger than 0.25 mm, furthermore desirably to be not larger than 0.15 mm, and most desirably to be not larger than 0.12 mm. If the wall thickness of the case is smaller than 0.05 mm, however, the case tends to be deformed or broken. Naturally, the lower limit in the wall thickness of the case should be 0.05 mm.

The wall thickness of the case is measured as follows. Specifically, three optional points apart from each other by at least 1 cm are selected in a region excluding the sealing portion of the case, and the thickness is measured in each of these three points so as to calculate the average value of the thickness. The average thickness thus calculated denotes the wall thickness of the case. Incidentally, where a foreign substance such as a resin is attached to the surface of the case, the thickness is measured after the foreign substance is removed. For example, where PVdF is attached to the surface of the case, the surface of the case is wiped with a dimethyl formamide solution so as to remove PVdF and, then, the thickness is measured.

It is desirable to form an adhesive layer in at least a part on the inner surface of the case and to bond the electrode group to the inner surface of the case by utilizing the adhesive layer. In the particular construction, it is possible to fix the case to the surface of the electrode group so as to make it possible to suppress the permeation of the electrolyte into the clearance between the electrode group and the case.

In the secondary battery of the present invention, it is desirable to apply the initial charging at a rate not lower than 0.05 C. and not higher than 0.8 C. under temperatures falling within a range of between 15° C. and 80° C. Incidentally, 1 C. denotes the current value required for discharging the nominal capacity (Ah) in an hour. It is possible to carry out the initial charging under these conditions for one cycle or a plurality of cycles. It is also possible to store the secondary battery for about 1 to 20 hours under the temperature condition of 15° C. to 80° C. before the initial charging.

As described above, the initial charging is performed under the temperature condition of 15° C. to 80° C. If the initial charging temperature is lower than 15° C., the liquid nonaqueous electrolyte maintains a high viscosity so as to make it difficult for the positive electrode, the negative electrode and the separator to be impregnated uniformly with the liquid nonaqueous electrolyte, with the result that the internal impedance is increased and the utilization of the active material is lowered. On the other hand, if the initial charging temperature exceeds 80° C., the binder contained in each of the positive electrode and the negative electrode is deteriorated. It is more desirable for the initial charging temperature to fall within a range of between 15° C. and 60° C., and more desirably between 20° C. and 50° C.

Where the initial charging rate is set to fall within a range of between 0.05 C. and 0.8 C. as described above, it is possible to retard appropriately the expansion of the positive electrode and the negative electrode caused by the charging, with the result that it is possible to permit the liquid nonaqueous electrolyte to be impregnated uniformly in the positive electrode and the negative electrode. It is more desirable for the initial charging rate to fall within a range of between 0.05 C. and 0.5C.

By the process described above, the liquid nonaqueous electrolyte can be impregnated uniformly in the clearances of the electrodes and the separator so as to decrease the internal impedance of the secondary battery. It follows that it is possible to increase the utilization of the active material, thereby increasing the substantial capacity of the secondary battery. It is also possible to improve the charge-discharge cycle characteristics and the large current discharge characteristics of the secondary battery.

A thin type lithium ion secondary battery, which is an example of the nonaqueous electrolyte secondary battery of the present invention, will now be described with reference to FIGS. 1 and 2.

Figure 2:
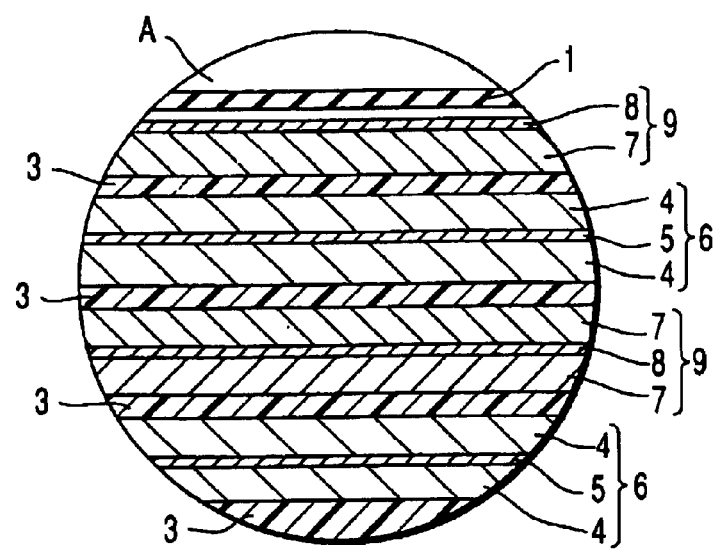
FIG. 2 is cross sectional view showing in a magnified fashion a portion A shown in FIG. 1.

FIG. 1 is a cross sectional view showing a thin type lithium ion secondary battery, which is an example of the nonaqueous electrolyte secondary battery of the present invention, and FIG. 2 is a cross sectional view showing in a magnified fashion a portion A shown in FIG. 1.

As shown in FIG. 1, an electrode group 2 is housed in a case 1 having a wall thickness X not larger than 0.3 mm. The electrode group 2 is prepared by, for example, winding a laminate structure including a positive electrode, a separator and a negative electrode in a flattened shape. As shown in FIG. 2, the laminate structure forming the electrode group 2 includes a separator 3; a positive electrode 6 including a positive electrode layer 4, a positive electrode current collector 5 and a positive electrode layer 4; a separator 3; a negative electrode 9 including a negative electrode layer 7, a negative electrode current collector 8, and a negative electrode layer 7; a separator 3; a positive electrode 6 including a positive electrode layer 4, a positive electrode current collector 5 and a positive electrode layer 4; a separator 3; and a negative electrode 9 including a negative electrode layer 7 and a negative electrode current collector 8 in the order mentioned as viewed from the lower side in the drawing. The negative electrode current collector 8 constitutes the outermost layer of the electrode group 2. One end of a band-like positive electrode lead 10 is connected to the positive electrode current collector 5 of the electrode group 2, and the other end portion of the positive electrode lead 10 extends from within the case 1. On the other hand, one end of a band-like negative electrode lead 11 is connected to the negative electrode current collector 8 of the electrode group 2, and the other end portion of the negative electrode lead 11 extends from within the case 1.

The nonaqueous electrolyte secondary battery (II) of the present invention will now be described.

The nonaqueous electrolyte secondary battery (II) of the present invention comprises a case substantially formed of a sheet material having a thickness not larger than 0.3 mm and an electrode group housed in the case. The electrode group includes a positive electrode capable of absorbing-desorbing lithium ions, a negative electrode capable of absorbing-desorbing lithium ions, and an electrolyte layer interposed between the positive electrode and the negative electrode and containing a liquid nonaqueous electrolyte and a polymer capable of gelling the liquid nonaqueous electrolyte.

It is possible to use the case, the positive electrode, the negative electrode and the liquid nonaqueous electrolyte similar to those described previously in conjunction with the nonaqueous electrolyte secondary battery (I) described previously.

The electrolyte layer can be formed, for example, as follows. In the first step, a paste containing a liquid nonaqueous electrolyte and a polymer capable of gelling the liquid nonaqueous electrolyte is formed into a film, followed by drying the formed film so as to obtain a thin film. Then, an electrode group is prepared by interposing the thin film thus obtained between a positive electrode and a negative electrode. The electrode group thus prepared is impregnated with a liquid nonaqueous electrolyte, followed by plasticizing the thin film under a reduced pressure so as to obtain the electrolyte layer.

It is desirable for the polymer to exhibit thermoplastic properties. The polymers meeting the particular requirement include, for example, polyvinylidene fluoride (PVdF), polyacrylonitrile (PAN), polyethylene oxide (PEO), polyvinyl chloride (PVC) polyacrylate (PMMA) and polyvinylidene fluoride-hexafluoro propylene (PVdF-HFP). It is possible to use in the present invention at least one kind of the polymer selected from the polymers enumerated above.

In the secondary battery of the present invention, it is desirable to apply the initial charging at a rate not lower than 0.05 C. and not higher than 0.8 C. under temperatures falling within a range of between 15° C. and 80° C. It is possible to carry out the initial charging under these conditions for one cycle or a plurality of cycles. It is also possible to store the secondary battery for about 1 to 20 hours under the temperature condition of 15° C. to 80° C. before the initial charging.

First embodiment of the nonaqueous electrolyte secondary battery of the present invention described above comprises a case having a wall thickness not larger than 0.3 mm, an electrode group provided in the case, and a nonaqueous electrolyte provided in the case and containing a nonaqueous solvent and a solute dissolved in the nonaqueous solvent. The nonaqueous solvent contains ethylene carbonate (EC), propylene carbonate (PC), γ-butyrolactone (BL) and vinylene carbonate (VC). The mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio w (% by volume) of vinylene carbonate based on the total amount of the nonaqueous solvent falls within a range of between 0.05 and 5, i.e., $0.05 \leq w \leq 5$.

In order to improve the weigh energy density and the volume energy density of the nonaqueous electrolyte secondary battery, it is necessary to set the wall thickness of the case at 0.3 mm or less. However, the case having a wall thickness not larger than 0.3 mm gives rise to the problem that the case tends to be swollen by the gas generated within the case.

Where the mixing ratio of γ-butyrolactone is set to fall within a range of between 30% by volume and 85% by volume based on the total amount of the nonaqueous solvent, it is possible to suppress the reaction between the positive electrode and the nonaqueous electrolyte during storage of the secondary battery under a high temperature condition and in the step of the initial charging so as to prevent the nonaqueous electrolyte from being decomposed by oxidation. As a result, it is possible to decrease the gas generation amount so as to suppress the swelling of the case.

Also, it is possible to form a protective film capable of permeating the lithium ions on the surface of the negative electrode with a high density by allowing the mixing ratio of ethylene carbonate based on the total amount of the nonaqueous solvent to fall within a range of between 15% by volume and 50% by volume, by allowing the mixing ratio of propylene carbonate based on the total amount of the nonaqueous solvent to fall within a range of between 2% by volume and 35% by volume, and by allowing the mixing ratio of vinylene carbonate based on the total amount of the nonaqueous solvent to fall within a range of between 0.05% by volume and 5% by volume. As a result, it is possible to suppress the reaction between the negative electrode and γ-butyrolactone so as to prevent the nonaqueous electrolyte from being decomposed by reduction. It follows that it is possible to suppress an increase in the interface impedance of the negative electrode so as to improve the charge-discharge cycle life and the discharge characteristics under low temperatures. If only one of PC and VC is added to the mix solvent consisting of EC and BL, the density of the protective film formed on the surface of the negative electrode is rendered insufficient in density so as to make it difficult to suppress sufficiently the reaction between the negative electrode and γ-butyrolactone. It follows that the secondary battery comprising a nonaqueous electrolyte containing a nonaqueous solvent containing PC, EC and BL fails to obtain a long life.

As described above, according to the nonaqueous electrolyte secondary battery of the present invention, it is possible to suppress the gas generation during storage of the secondary battery under high temperatures and in the initial charging step of the secondary battery. It is also possible to improve the weight energy density, the volume energy density, the charge-discharge cycle life and the discharge characteristics under low temperatures of the secondary battery.

Second embodiment of the nonaqueous electrolyte secondary battery of the present invention comprises a case having a wall thickness not larger than 0.3 mm, a positive electrode provided in the case and capable of absorbing-desorbing lithium ions, a negative electrode provided in the case and capable of absorbing-desorbing lithium ions, a separator arranged between the positive electrode and the negative electrode, and a liquid nonaqueous electrolyte impregnated in at least the separator and the liquid nonaqueous electrolyte containing a nonaqueous solvent and a solute dissolved in the nonaqueous solvent. The nonaqueous solvent contains ethylene carbonate, propylene carbonate, γ-butyrolactone and vinylene carbonate. The mixing ratio x (% by volume) of ethylene carbonate based on the total amount of the nonaqueous solvent falls within a range of between 15 and 50, i.e., $15 \leq x \leq 50$, the mixing ratio y (% by volume) of propylene carbonate based on the total amount of the nonaqueous solvent falls within a range of between 2 and 35, i.e., $2 \leq y \leq 35$, the mixing ratio z (% by volume) of γ-butyrolactone based on the total amount of the nonaqueous solvent falls within a range of between 30 and 85, i.e., $30 \leq z \leq 85$, and the mixing ratio w (% by volume) of vinylene carbonate based on the total amount of the nonaqueous solvent falls within a range of between 0.05 and 5, i.e., $0.05 \leq w \leq 5$.

A liquid nonaqueous electrolyte is used in the secondary battery of the present invention so as to increase the ionic conductivity, thereby decreasing the interface resistance between the positive electrode and the separator and the interface resistance between the negative electrode and the separator. As a result, it is possible to further improve the charge-discharge cycle life and the discharge characteristics under low temperatures of the secondary battery without adversely affecting the energy density and the problem of the swelling during storage of the secondary battery under high temperatures and in the initial charging step of the secondary battery.

Third embodiment of the nonaqueous electrolyte secondary battery of the present invention comprises a case having a wall thickness not larger than 0.3 mm, an electrode group provided in the case, and a nonaqueous electrolyte provided in the case and the nonaqueous electrolyte containing a nonaqueous solvent A and a solute dissolved in the nonaqueous solvent A. The nonaqueous solvent A contains ethylene carbonate, propylene carbonate, γ-butyrolactone and a fourth component including at least one solvent selected from the group consisting of vinylene carbonate, vinylethylene carbonate, ethylene sulfite, phenylethylene carbonate, 12-crown-4 and tetraethylene glycol dimethyl ether. The mixing ratio x (% by volume) of ethylene carbonate based on the total amount of the nonaqueous solvent A falls within a range of between 15 and 50, i.e., $15 \leq x \leq 50$, the mixing ratio y (% by volume) of propylene carbonate based on the total amount of the nonaqueous solvent A falls within a range of between 2 and 35, i.e., $2 \leq y \leq 35$, the mixing ratio z (% by volume) of γ-butyrolactone based on the total amount of the nonaqueous solvent A falls within a range of between 30 and 85, i.e., $30 \leq z \leq 85$, and the mixing ratio p (% by volume) of the fourth component based on the total amount of the nonaqueous solvent A is larger than 0 and not larger than 5, i.e., $0 < p \leq 5$.

The nonaqueous electrolyte containing γ-butyrolactone produces the effect of suppressing the gas generation in the initial charging step and during storage of the secondary battery under high temperatures. However, self-discharge tends to proceed during storage of the secondary battery comprising a nonaqueous electrolyte containing γ-butyrolactone, with the result that the capacity recovery rate is lowered when the secondary battery is charged again after the storage. According to the third embodiment of the secondary battery of the present invention, however, it is possible to suppress the gas generation in the initial charging step and during storage of the secondary battery under high temperatures and to suppress the progress of the self-discharge during storage of the secondary battery under high temperatures. At the same time, it is possible to improve the charge-discharge cycle characteristics.

Fourth embodiment of the nonaqueous electrolyte secondary battery of the present invention comprises a case having a wall thickness not larger than 0.3 mm, an electrode group provided in the case, and a nonaqueous electrolyte provided in the case and the nonaqueous electrolyte containing a nonaqueous solvent C and a solute dissolved in the nonaqueous solvent C. The nonaqueous solvent C contains ethylene carbonate, propylene carbonate, γ-butyrolactone, vinylene carbonate and a fifth component including at least one solvent selected from the group consisting of vinylethylene carbonate, ethylene sulfite, phenylethylene carbonate, 12-crown-4 and tetraethylene glycol dimethyl ether. The mixing ratio x (% by volume) of ethylene carbonate based on the total amount of the nonaqueous solvent C falls within a range of between 15 and 50, i.e., $15 \leq x \leq 50$, the mixing ratio y (% by volume) of propylene carbonate based on the total amount of the nonaqueous solvent C falls within a range of between 2 and 35, i.e., $2 \leq y \leq 35$, the mixing ratio z (% by volume) of γ-butyrolactone based on the total amount of the nonaqueous solvent C falls within a range of between 30 and 85, i.e., $30 \leq z \leq 85$, the mixing ratio w (% by volume) of vinylene carbonate based on the total amount of the nonaqueous solvent C is larger than 0 and not larger than 5, i.e., $0 < w \leq 5$, and the mixing ratio q (% by volume) of the fifth component based on the total amount of the nonaqueous solvent C is larger than 0 and not larger than 5, i.e., $0 < q \leq 5$.

According to the secondary battery of the particular construction, it is possible to suppress the gas generation during the initial charging step and during storage of the secondary battery under high temperatures and to suppress the progress of the self-discharge during storage of the secondary battery under high temperatures. At the same time, it is possible to improve the charge-discharge cycle characteristics.

Examples of the present invention will now be described in detail with reference to the accompanying drawings.

EXAMPLE 1

<Preparation of Positive Electrode>

A slurry was prepared by adding 91% by weight of a lithium cobalt oxide ($Li_xCoO_2$, where x is larger than 0 and not larger than 1, i.e., $0 < x \leq 1$), 3% by weight of acetylene black, 3% by weight of graphite, and 3% by weight of polyvinylidene fluoride (PVdF) used as a binder to N-methyl-2-pyrrolidone (NMP) used as a solvent. Both surfaces of a current collector formed of an aluminum foil having a thickness of 15 μm were coated with the resultant slurry, followed by drying the coating and subsequently pressing the coated current collector so as to prepare a positive electrode having an electrode density of 3 $g/cm^3$ and including positive electrode layers formed on the both surfaces of the current collector.

<Preparation of Negative Electrode>

A slurry was prepared by adding 93% by weight of a mesophase pitch based carbon fiber powder used as a carbonaceous material and subjected to a heat treatment at 3,000° C. to 7% by weight of polyvinylidene fluoride (PVdF) used as a binder. The carbon fiber noted above had a fiber diameter of 8 μm, an average fiber length of 20 μm, and an average layer spacing $d_{002}$ of 0.3360 nm. Both surfaces of a current collector formed of a copper foil having a thickness of 12 μm were coated with the resultant slurry, followed by drying the coating and subsequently pressing the coated current collector so as to prepare a negative electrode having an electrode density of 1.4 $g/cm^3$ and including negative electrode layers formed on the both surfaces of the current collector.

≦Separator>

Prepared was a separator formed of a polyethylene porous film having a thickness of 25 μm, exhibiting a thermal shrinkage of 20% at 120° C. for one hour, and having a porosity of 50%.

≦Preparation of Nonaqueous Electrolyte>

Prepared was a nonaqueous solvent by mixing ethylene carbonate (EC), propylene carbonate (PC), γ-butyrolactone (BL) and vinylene carbonate (VC) at a volume ratio of 25 (EC):2 (PC):72 (BL):1 (VC). Then, lithium tetrafluoro borate ($LiBF_4$) was dissolved in the resultant nonaqueous solvent in a concentration of 1.5 mol/L so as to obtain a liquid nonaqueous electrolyte.

≦Preparation of Electrode Group>

A band-like positive electrode lead was welded to the current collector of the positive electrode, and a band-like negative electrode lead was welded to the current collector of the negative electrode. Then, a laminate structure comprising the positive electrode, the negative electrode, and the separator interposed between the positive electrode and the negative electrode was spirally wound and formed in a flat shape so as to prepare an electrode group.

The electrode group thus prepared was subjected to a press molding for 25 seconds under a pressure of 13 $kg/cm^2$ while heating the electrode group to 90° C. so as to make integral the positive electrode, the negative electrode and the separator.

On the other hand, a laminate film having a thickness of 100 μm and comprising an aluminum foil and polypropylene films formed on the both surfaces of the aluminum foil was formed into a bag, and the electrode group was housed in the bag thus prepared. Then, a vacuum drying was applied at 80° C. for 12 hours to the electrode group housed in the bag of the laminate film so as to remove the water contained in the electrode group and the laminate film.

In the next step, the liquid nonaqueous electrolyte was poured into the electrode group housed in the bag of the laminate film in an amount of 4.8 g/1 Ah of the battery capacity so as to prepare a thin type nonaqueous electrolyte secondary battery constructed as shown in FIGS. 1 and 2 and having a thickness of 3.6 mm, a width of 35 mm and a height of 62 mm.

An initial charge-discharge process was applied as follows to the nonaqueous electrolyte secondary battery thus prepared. Specifically, the nonaqueous electrolyte secondary battery was left to stand under a high temperature environment of 45° C. for 2 hours, followed by performing a constant current-constant voltage charging to 4.2 V for 15 hours under the high temperature environment with a current of 0.2 C. (104 mA). Then, the secondary battery was left to stand for 7 days at 20° C., followed by discharging the secondary battery to 3.0 V under an environment of 20° C. with a current of 0.2 C. so as to manufacture the nonaqueous electrolyte secondary battery.

EXAMPLES 2 to 22

Thin type nonaqueous electrolyte secondary batteries were manufactured as in Example 1, except that the composition of the nonaqueous solvent was changed as shown in Table 1.

Comparative Examples 1 to 11

Thin type nonaqueous electrolyte secondary batteries were manufactured as in Example 1, except that the composition of the nonaqueous solvent and the lithium salt used were changed as shown in Table 2.

The battery characteristics were evaluated as follows in respect of the secondary battery prepared in each of Examples 1 to 22 and Comparative Examples 1 to 11.

1) Capacity Retention Rate after 400 Cycles under Environment of 20° C.

A charge-discharge cycle, in which a constant current-constant voltage charging to 4.2 V was performed for 3 hours with a current of 1 C., followed by discharging the secondary battery to 3.0 V with a current of 1 C., was repeated under an environment of 20° C. so as to measure the capacity retention rate after 400 charge-discharge cycles and the maximum discharge capacity during the 400 charge-discharge cycles. Tables 1 and 2 also show the results.

2) Capacity Retention Rate after 200 Cycles under Environment of 45° C.

A charge-discharge cycle, in which a constant current-constant voltage charging to 4.2 V was performed for 3 hours with a current of 1 C., followed by discharging the secondary battery to 3.0 V with a current of 1 C., was repeated under an environment of 45° C. so as to measure the capacity retention rate after 200 charge-discharge cycles. Tables 1 and 2 also show the results.

3) Self-discharge Characteristics under Environment of 65° C.

In order to examine the self-discharge characteristics under a high temperature environment, a constant current-constant voltage charging to 4.2 V was performed for 10 hours with a current of 0.2 C. under an environment of 20° C., followed by performing a constant current-constant voltage discharge to 3.4 V for 10 hours with a current of 0.2 C. under an environment of 20° C. Then, the secondary battery was left to stand within a constant temperature bath of 65° C., and the battery voltage was monitored so as to measure the time required for the battery voltage to be lowered to 2.5 V by the self-discharge. Tables 1 and 2 also show the results.

4) Swelling during Storage under Environment of 85° C.

In order to examine the swelling of the battery during the storage under a high temperature environment and under a charged state, a constant current-constant voltage charging to 4.2 V were performed for 3 hours with a current of 1 C. under an environment of 20° C., followed by leaving the battery to stand within a constant temperature bath of 85° C. for 120 hours. Then, the battery was taken out of the constant temperature bath and left to stand under an environment of 20° C. for 2 hours so as to measure the swelling of the battery. Tables 1 and 2 also show the results.

TABLE 1

| | Composition of nonaqueous solvent (% by volume) | | | | | Solute concentration | Maximum discharge capacity | Capacity retention rate, 400 cycles/ | Capacity retention rate, 200 cycles/ | Storage characteristics | Swelling after storage at 85° C. |
|---|---|---|---|---|---|---|---|---|---|---|---|
| | EC | PC | BL | VC | Solute | (mol/L) | (Ah) | 20° C. (%) | 45° C. (%) | (day) | (%) |
| Example 1 | 25 | 2 | 72 | 1 | LiBF$_4$ | 1.5 | 0.52 | 77 | 45 | 11 | 2 |
| Example 2 | 25 | 9 | 65 | 1 | LiBF$_4$ | 1.5 | 0.52 | 84 | 50 | 11 | 2 |
| Example 3 | 20 | 18 | 60 | 2 | LiBF$_4$ | 1.5 | 0.52 | 83 | 60 | more than 20 | 3 |
| Example 4 | 22 | 11 | 66 | 1 | LiBF$_4$ | 1.5 | 0.52 | 82 | 51 | 11 | 1 |
| Example 5 | 25 | 23 | 50 | 2 | LiBF$_4$ | 1.5 | 0.52 | 84 | 62 | more than 20 | 2 |
| Example 6 | 30 | 9 | 60 | 1 | LiBF$_4$ | 1.5 | 0.52 | 83 | 51 | 11 | 2 |
| Example 7 | 30 | 9.9 | 60 | 0.1 | LiBF$_4$ | 1.5 | 0.52 | 80 | 42 | 10 | 3 |
| Example 8 | 31 | 2 | 62 | 5 | LiBF$_4$ | 1.5 | 0.52 | 79 | 50 | more than 20 | 1 |
| Example 9 | 15 | 30 | 50 | 5 | LiBF$_4$ | 1.5 | 0.52 | 77 | 40 | more than 20 | 4 |
| Example 10 | 15 | 30 | 54.9 | 0.1 | LiBF$_4$ | 1.5 | 0.52 | 75 | 45 | 10 | 3 |
| Example 11 | 30 | 30 | 35 | 5 | LiBF$_4$ | 1.5 | 0.52 | 82 | 47 | more than 20 | 3 |
| Example 12 | 34.9 | 30 | 35 | 0.1 | LiBF$_4$ | 1.5 | 0.52 | 77 | 44 | 11 | 4 |
| Example 13 | 15 | 2 | 78 | 5 | LiBF$_4$ | 1.5 | 0.52 | 77 | 40 | more than 20 | 2 |
| Example 14 | 15 | 2 | 82.9 | 0.1 | LiBF$_4$ | 1.5 | 0.52 | 75 | 38 | 9 | 1 |
| Example 15 | 50 | 2 | 43 | 5 | LiBF$_4$ | 1.5 | 0.52 | 82 | 43 | more than 20 | 2 |

TABLE 1-continued

| | Composition of nonaqueous solvent (% by volume) | | | | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|---|---|---|
| | EC | PC | BL | VC | | | | | | | |
| Example 16 | 50 | 2 | 47.9 | 0.1 | LiBF$_4$ | 1.5 | 0.52 | 84 | 40 | 10 | 1 |
| Example 17 | 50 | 10 | 35 | 5 | LiBF$_4$ | 1.5 | 0.52 | 83 | 50 | more than 20 | 2 |
| Example 18 | 50 | 14.9 | 35 | 0.1 | LiBF$_4$ | 1.5 | 0.52 | 83 | 50 | 10 | 2 |
| Example 19 | 33 | 33 | 33 | 1 | LiBF$_4$ | 1.5 | 0.52 | 79 | 63 | 13 | 4 |
| Example 20 | 21 | 35 | 42 | 2 | LiBF$_4$ | 1.5 | 0.52 | 78 | 65 | more than 20 | 3 |
| Example 21 | 22 | 33 | 44 | 1 | LiBF$_4$ | 1.5 | 0.52 | 70 | 62 | 12 | 10 |
| Example 22 | 30 | 10 | 59.97 | 0.03 | LiBF$_4$ | 1.5 | 0.52 | 70 | 42 | 10 | 3 |

TABLE 2

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Comparative example 1 | 100% BL | LiBF$_4$ | 1.5 | 0.30 | 0.1 | 0.1 | 1 | 1 |
| Comparative example 2 | 25% EC, 50% BL, 25% MEC | LiBF$_4$ | 1.5 | 0.30 | 0.1 | 0.1 | 4 | 100 |
| Comparative example 3 | 75% EC, 25% BL | LiBF$_4$ | 1.5 | 0.40 | 30 | 0.1 | 5 | 20 |
| Comparative example 4 | 1% EC, 99% BL | LiBF$_4$ | 1.5 | 0.35 | 0.1 | 0.1 | 1 | 10 |
| Comparative example 5 | 25% EC, 75% MEC | LiPF$_6$ | 1.5 | 0.52 | 0.1 | 0.1 | more than 20 | 50 |
| Comparative example 6 | 30% EC, 60% BL, 10% PC | LiBF$_4$ | 1.5 | 0.52 | 65 | 15 | 3 | 5 |
| Comparative example 7 | 33% EC, 65% BL, 1% PC, 1% VC | LiBF$_4$ | 1.5 | 0.52 | 70 | 20 | 9 | 1 |
| Comparative example 8 | 28% EC, 56% BL, 10% PC, 6% VC | LiBF$_4$ | 1.5 | 0.52 | 70 | 0.1 | more than 20 | 6 |
| Comparative example 9 | 25% EC, 50% BL, 25% PC | LiBF$_4$ | 1.5 | 0.50 | 65 | 15 | 5 | 6 |
| Comparative example 10 | 22% EC, 44% BL, 34% PC | LiBF$_4$ | 1.5 | 0.50 | 55 | 15 | 5 | 10 |
| Comparative example 11 | 33% EC, 66% BL, 1% VC | LiBF$_4$ | 1.5 | 0.52 | 50 | 10 | 9 | 1 |

As apparent from Tables 1 and 2, the secondary battery for each of Examples 1 to 22 of the present invention comprises a liquid nonaqueous electrolyte containing a nonaqueous solvent containing EC in an amount x of $15 \leq x \leq 50$, containing PC in an amount y of $2 \leq y \leq 35$, containing BL in an amount z of $30 \leq z \leq 85$, and also containing VC in an amount w of $0.05 \leq w \leq 5$. The secondary battery containing the particular nonaqueous electrolyte exhibited a high discharge capacity and a high capacity retention rate under room temperature and at 45° C. In addition, it was possible to suppress the self-discharge at 65° C. and to suppress the swelling during storage of the secondary battery at 85° C. Particularly, the capacity retention rate after 400 charge-discharge cycles was found to be 80% or more in the secondary battery for each of Examples 2 to 7, 11 and 15 to 18.

On the other hand, the secondary battery for each of Comparative Examples 1 to 11 was found to be inferior to the secondary battery for each of Examples 1 to 22 of the present invention in the capacity retention rate at room temperature and at 45° C.

Also, the charge-discharge circuit of the secondary battery for Example 1 was left open for 5 hours or more after the initial charge-discharge process so as to settle the potential sufficiently, followed by dismantling the secondary battery within a glove box having an Ar concentration of at least 99.9% and a dew point not higher than −50° C. so as to take out the electrode group. The electrode group thus taken out was put in a centrifugal sinking tube. The tube was filled with dimethyl sulfoxide (DMSO)-d$_6$, and the tube was sealed. Then, the centrifugal sinking tube was taken out of the glove box and subjected to a centrifugal separation. Further, a mixed solution containing the electrolyte and (DMSO)-d$_6$ was collected from the centrifugal sinking tube within the glove box. About 0.5 mL of the mixed solution was put in a sample tube for an NMR having a diameter of 5 mm for performing the NMR measurement. An apparatus "JNM-LA 400WB" manufactured by JEOL was used for the NMR measurement. The observation nucleus was $^1$H, the observation frequency was 400 MHz, and the internal standard of dimethyl sulfoxide (DMSO)-d$_5$ (2.5 ppm) was used as the standard substance. Further, the measuring temperature was set at 25° C. In the $^1$HNMR spectrum, the peak corresponding to EC was observed around 4.5 ppm, and the peak corresponding to VC was observed around 7.7 ppm, supporting that VC was contained in the nonaqueous solvent present in the secondary battery for Example 1 after the initial charge-discharge process. Also, a ratio of the NMR integration intensity for VC to the NMR integration intensity for EC was obtained. It has been found that the ratio of VC to the entire nonaqueous solvent was decreased from the value before assembly of the secondary battery.

EXAMPLE 23

≦Preparation of Liquid Nonaqueous Electrolyte>

Prepared was a nonaqueous solvent by mixing ethylene carbonate (EC), propylene carbonate (PC), γ-butyrolactone (BL) and vinylene carbonate (VC) at a volume ratio of 25 (EC):9 (PC):65 (BL):1 (VC). Then, lithium tetrafluoro borate ($LiBF_4$) was dissolved in the resultant nonaqueous solvent in a concentration of 1.5 mol/L so as to obtain a liquid nonaqueous electrolyte.

≦Preparation of Electrode Group>

A flat electrode group was prepared as in Example 1. Then, a heat press was applied to the electrode group under the conditions similar to those employed in Example 1 described previously so as to make integral the positive electrode, the negative electrode and the separator.

On the other hand, an aluminum sheet having a thickness of 300 μm was formed into a rectangular can having a thickness of 4 mm, a width of 34 mm and a height of 58 mm, and the electrode group was housed in the aluminum can thus prepared. Then, a vacuum drying was applied to the electrode group housed in the aluminum can so as to remove the water contained in the electrode group.

In the next step, the liquid nonaqueous electrolyte was poured into the electrode group housed in the aluminum can in an amount of 4.8 g/1 Ah of the battery capacity so as to prepare a thin type nonaqueous electrolyte secondary battery.

An initial charge-discharge process was applied to the nonaqueous electrolyte secondary battery thus prepared under the conditions similar to those employed in Example 1 so as to manufacture the nonaqueous electrolyte secondary battery.

EXAMPLES 24 to 28

A thin type nonaqueous electrolyte secondary battery was manufactured as in Example 23, except that the composition of the nonaqueous solvent was changed as shown in Table 3.

Comparative Examples 12 to 17

A thin type nonaqueous electrolyte secondary battery was manufactured as in Example 23, except that the composition of the nonaqueous solvent and the lithium salt used were changed as shown in Table 3.

The capacity retention rate under room temperature and at 45° C., the maximum discharge capacity, the storage characteristics under an environment of 65° C., and the swelling at 85° C. were measured under the conditions similar to those in Example 1 in respect of the secondary battery for each of Examples 23 to 28 and Comparative Examples 12 to 17. Table 3 also shows the result.

TABLE 3

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 23 | 25% EC, 65% BL, 9% PC, 1% VC | $LiBF_4$ | 1.5 | 0.52 | 83 | 52 | 11 | 1 |
| Example 24 | 20% EC, 60% BL, 18% PC, 2% VC | $LiBF_4$ | 1.5 | 0.52 | 83 | 61 | more than 20 | 2 |
| Example 25 | 22% EC, 66% BL, 11% PC, 1% VC | $LiBF_4$ | 1.5 | 0.52 | 80 | 50 | 11 | 1 |
| Example 26 | 25% EC, 50% BL, 23% PC, 2% VC | $LiBF_4$ | 1.5 | 0.52 | 83 | 60 | more than 20 | 2 |
| Example 27 | 30% EC, 60% BL, 9% PC, 1% VC | $LiBF_4$ | 1.5 | 0.52 | 83 | 50 | 11 | 1 |
| Example 28 | 22% EC, 44% BL, 33% PC, 1% VC | $LiBF_4$ | 1.5 | 0.52 | 81 | 60 | 12 | 4 |
| Comparative example 12 | 100% BL | $LiBF_4$ | 1.5 | 0.30 | 0.1 | 0.1 | 1 | 1 |
| Comparative example 13 | 25% EC, 50% BL, 25% MEC | $LiBF_4$ | 1.5 | 0.30 | 0.1 | 0.1 | 3 | 30 |
| Comparative example 14 | 75% EC, 25% BL | $LiBF_4$ | 1.5 | 0.40 | 30 | 0.1 | 5 | 8 |
| Comparative example 15 | 1% EC, 99% BL | $LiBF_4$ | 1.5 | 0.35 | 0.1 | 0.1 | 1 | 6 |
| Comparative example 16 | 25% EC, 75% MEC | $LiPF_6$ | 1.5 | 0.52 | 0.1 | 0.1 | more than 20 | 10 |
| Comparative example 17 | 30% EC, 60% BL, 10% PC | $LiBF_4$ | 1.5 | 0.52 | 65 | 14 | 4 | 3 |

As apparent from Table 3, the secondary battery for each of Examples 23 to 28 of the present invention comprises a liquid nonaqueous electrolyte containing a nonaqueous solvent containing EC in an amount x of $15 \leq x \leq 50$, containing PC in an amount y of $2 \leq y \leq 30$, containing BL in an amount z of $35 \leq z \leq 85$, and also containing VC in an amount w of $0.05 \leq w \leq 5$. The secondary battery containing the particular nonaqueous electrolyte exhibited a high discharge capacity and a high capacity retention rate under room temperature and at 45° C. In addition, it was possible to suppress the self-discharge at 65° C. and to suppress the swelling during storage of the secondary battery at 85° C.

On the other hand, the secondary battery for each of Comparative Examples 12 to 17 was found to be inferior to the secondary battery for each of Examples 23 to 28 of the present invention in the capacity retention rate at room temperature and at 45° C.

EXAMPLE 29

≦Preparation of Nonaqueous Electrolyte>

Prepared was a nonaqueous solvent by mixing ethylene carbonate (EC), propylene carbonate (PC), γ-butyrolactone (BL) and vinylene carbonate (VC) at a volume ratio of 25 (EC):9 (PC):65 (BL):1 (VC). Then, lithium tetrafluoro borate ($LiBF_4$) was dissolved in the resultant nonaqueous solvent in a concentration of 1.5 mol/L so as to obtain a liquid nonaqueous electrolyte. Then, the liquid nonaqueous electrolyte thus prepared was mixed with a solution prepared by dissolving polyvinylidene fluoride hexafluoro propylene (PVdF-HFP) in tetrahydrofuran (THF) so as to prepare a paste. A substrate was coated with the resultant paste and, then, dried so as to obtain a thin film.

≦Preparation of Electrode Group>

A band-like positive electrode lead was welded to the current collector of the positive electrode similar to that used in Example 1, and a band-like negative electrode lead was welded to the current collector of the negative electrode similar to that used in Example 1. Then, a laminate structure comprising the positive electrode, the negative electrode, and the thin film interposed between the positive electrode and the negative electrode was spirally wound and formed in a flat shape so as to prepare an electrode group.

The electrode group thus prepared was dipped in the liquid nonaqueous electrolyte referred to above, and the thin film was plasticized under a reduced pressure so as to obtain an electrode group having an electrolyte layer interposed between the positive electrode and the negative electrode.

On the other hand, a laminate film having a thickness of 100 μm and comprising an aluminum foil and polypropylene films formed on the both surfaces of the aluminum foil was formed into a bag, and the electrode group was housed in the bag thus prepared so as to assemble a thin type nonaqueous electrolyte secondary battery having a thickness of 3.6 mm, a width of 35 mm and a height of 62 mm.

An initial charge-discharge process was applied as follows to the nonaqueous electrolyte secondary battery thus prepared. Specifically, the nonaqueous electrolyte secondary battery was left to stand under a high temperature environment of 45° C. for 2 hours, followed by performing a constant current-constant voltage charging to 4.2 V for 15 hours under the high temperature environment with a current of 0.2 C. (84 mA). Then, the secondary battery was left to stand for 7 days at 20° C., followed by discharging the secondary battery to 3.0 V under an environment of 20° C. with a current of 0.2 C. so as to manufacture the nonaqueous electrolyte secondary battery.

EXAMPLES 30 to 34

A thin type nonaqueous electrolyte secondary battery was manufactured as in Example 29, except that the composition of the nonaqueous solvent was changed as shown in Table 4.

Comparative Examples 18 to 24

A thin type nonaqueous electrolyte secondary battery was manufactured as in Example 29, except that the composition of the nonaqueous solvent and the lithium salt used were changed as shown in Table 4.

The battery characteristics were measured as follows for the secondary battery for each of Examples 29 to 34 and Comparative Examples 18 to 24

1) Capacity Retention Rate after 300 Cycles under Environment of 20° C.

A charge-discharge cycle, in which a constant current-constant voltage charging to 4.2 V was performed for 3 hours with a current of 1 C., followed by discharging the secondary battery to 3.0 V with a current of 1 C., was repeated under an environment of 20° C. so as to measure the capacity retention rate after 300 charge-discharge cycles and the maximum discharge capacity during the 300 charge-discharge cycles. Table 4 show the results.

2) Capacity Retention Rate after 200 Cycles under Environment of 45° C.

A charge-discharge cycle, in which a constant current-constant voltage charging to 4.2 V was performed for 3 hours with a current of 1 C., followed by discharging the secondary battery to 3.0 V with a current of 1 C., was repeated under an environment of 45° C. so as to measure the capacity retention rate after 200 charge-discharge cycles. Table 4 also show the results.

3) Self-discharge Characteristics under Environment of 65° C.

The self-discharge characteristics under an environment of 65° C. were evaluated by the method similar to that employed in Example 1. Table 4 also shows the results.

4) Swelling during Storage under Environment of 85° C.

The swelling of the secondary battery during storage under an environment of 85° C. and under a charged state was evaluated by a method similar to that employed in Example 1. Table 4 also shows the results.

TABLE 4

| | Composition of nonaqueous solvent (% by volume) | Solute | Solute concentration (mol/L) | Maximum discharge capacity (Ah) | Capacity retention rate, 300 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 29 | 25% EC, 65% BL, 9% PC, 1% VC | $LiBF_4$ | 1.5 | 0.42 | 80 | 47 | 13 | 1 |
| Example 30 | 20% EC, 60% BL, 18% PC, 2% VC | $LiBF_4$ | 1.5 | 0.42 | 79 | 55 | more than 20 | 2 |
| Example 31 | 22% EC, 66% BL, 11% PC, 1% VC | $LiBF_4$ | 1.5 | 0.42 | 78 | 45 | 13 | 1 |
| Example 32 | 25% EC, 50% BL, 23% PC, 2% VC | $LiBF_4$ | 1.5 | 0.42 | 80 | 55 | more than 20 | 2 |
| Example 33 | 30% EC, 60% BL, 9% PC, 1% VC | $LiBF_4$ | 1.5 | 0.42 | 79 | 45 | 13 | 1 |
| Example 34 | 22% EC, 44% BL, 33% PC, 1% VC | $LiBF_4$ | 1.5 | 0.42 | 68 | 55 | 14 | 5 |

TABLE 4-continued

| | Composition of nonaqueous solvent (% by volume) | Solute | Solute concentration (mol/L) | Maximum discharge capacity (Ah) | Capacity retention rate, 300 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Comparative example 18 | 100% BL | LiBF$_4$ | 1.5 | 0.20 | 0.1 | 0.1 | 1 | 1 |
| Comparative example 19 | 25% EC, 50% BL, 25% MEC | LiBF$_4$ | 1.5 | 0.20 | 0.1 | 0.1 | 4 | 30 |
| Comparative example 20 | 75% EC, 25% BL | LiBF$_4$ | 1.5 | 0.30 | 20 | 0.1 | 5 | 8 |
| Comparative example 21 | 40% EC, 60% BL | LiBF$_4$ | 1.5 | 0.42 | 20 | 0.1 | 3 | 6 |
| Comparative example 22 | 25% EC, 75% MEC | LiPF$_6$ | 1.5 | 0.42 | 0.1 | 0.1 | more than 20 | 10 |
| Comparative example 23 | 30% EC, 60% BL, 10% PC | LiBF$_4$ | 1.5 | 0.42 | 60 | 13 | 4 | 3 |
| Comparative example 24 | 25% EC, 50% BL, 25% PC | LiBF$_4$ | 1.5 | 0.40 | 60 | 16 | 5 | 4 |

As apparent from Table 4, the secondary battery for each of Examples 29 to 34 of the present invention comprises a gel like nonaqueous electrolyte containing a nonaqueous solvent containing EC in an amount x of $15 \leq x \leq 50$, containing PC in an amount y of $2 \leq y \leq 35$, containing BL in an amount z of $30 \leq z \leq 85$, and also containing VC in an amount w of $0.05 \leq w \leq 5$. The secondary battery containing the particular nonaqueous electrolyte exhibited a high discharge capacity and a high capacity retention rate under room temperature and at 45° C. In addition, it was possible to suppress the self-discharge at 65° C. and to suppress the swelling during storage of the secondary battery at 85° C.

On the other hand, the secondary battery for each of Comparative Examples 18 to 24 was found to be inferior to the secondary battery for each of Examples 29 to 34 of the present invention in the capacity retention rate at room temperature and at 45° C.

EXAMPLES 35 to 94

Liquid nonaqueous electrolytes were prepared by dissolving the solute shown in Tables 5 to 10 in the nonaqueous solvents having the compositions shown in Tables 5 to 10 in concentrations shown in Tables 5 to 10. Then, thin type nonaqueous electrolyte secondary batteries were manufactured as in Example 1, except that used were the liquid nonaqueous electrolytes thus prepared.

In Tables 5 to 10, "VEC" denotes vinylethylene carbonate, "ES" denotes ethylene sulfite, "phEC" denotes phenylethylene carbonate, "Crown" denotes 12-crown-4, and "Ether" denotes tetraethylene glycol dimethyl ether.

The capacity retention rate at room temperature and at 45° C., the maximum discharge capacity, the storage characteristics under an environment of 65° C. and the swelling at 85° C. were measured under the conditions similar to those for Example 1 in respect of the secondary battery obtained in each of Examples 35 to 94. Tables 5 to 10 also show the results.

TABLE 5

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 35 | 25% EC, 72% BL, 2.5% PC, 0.5% VEC | LiBF$_4$ | 1.5 | 0.52 | 45 | 56 | more than 20 | 1 |
| Example 36 | 25% EC, 65% BL, 9.5% PC, 0.5% VEC | LiBF$_4$ | 1.5 | 0.52 | 50 | 56 | more than 20 | 1 |
| Example 37 | 20% EC, 60% BL, 19% PC, 1% VEC | LiBF$_4$ | 1.5 | 0.52 | 40 | 66 | more than 20 | 1 |
| Example 38 | 22% EC, 66% BL, 11.5% PC, 0.5% VEC | LiBF$_4$ | 1.5 | 0.52 | 51 | 59 | more than 20 | 1 |
| Example 39 | 25% EC, 50% BL, 24% PC, 1% VEC | LiBF$_4$ | 1.5 | 0.52 | 40 | 62 | more than 20 | 2 |
| Example 40 | 30% EC, 60% BL, 9.5% PC, 0.5% VEC | LiBF$_4$ | 1.5 | 0.52 | 50 | 56 | more than 20 | 1 |
| Example 41 | 30% EC, 60% BL, 9.9% PC, 0.1% VEC | LiBF$_4$ | 1.5 | 0.52 | 70 | 49 | 15 | 2 |
| Example 42 | 31% EC, 62% BL, 2% PC, 5% VEC | LiBF$_4$ | 1.5 | 0.52 | 36 | 51 | more than 20 | 1 |
| Example 43 | 15% EC, 50% BL, 30% PC, 5% VEC | LiBF$_4$ | 1.5 | 0.52 | 35 | 51 | more than 20 | 2 |
| Example 44 | 22% EC, 44% BL, 33.5% PC, 0.5% VEC | LiBF$_4$ | 1.5 | 0.52 | 50 | 65 | more than 20 | 4 |

TABLE 6

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 45 | 20% EC, 60% BL, 19% PC, 1% ES | LiBF$_4$ | 1.5 | 0.52 | 78 | 55 | 3 | 1 |
| Example 46 | 22% EC, 66% BL, 11.5% PC, 0.5% ES | LiBF$_4$ | 1.5 | 0.52 | 78 | 48 | 3 | 1 |
| Example 47 | 25% EC, 50% BL, 24% PC, 1% ES | LiBF$_4$ | 1.5 | 0.52 | 81 | 57 | 3 | 2 |
| Example 48 | 30% EC, 60% BL, 9.5% PC, 0.5% ES | LiBF$_4$ | 1.5 | 0.52 | 80 | 53 | 3 | 1 |
| Example 49 | 22% EC, 44% BL, 33.5% PC, 0.5% ES | LiBF$_4$ | 1.5 | 0.52 | 81 | 57 | 5 | 4 |
| Example 50 | 20% EC, 60% BL, 18% PC, 2% phEC | LiBF$_4$ | 1.5 | 0.52 | 82 | 45 | 4 | 1 |
| Example 51 | 22% EC, 66% BL, 11% PC, 1% phEC | LiBF$_4$ | 1.5 | 0.52 | 75 | 41 | 4 | 1 |
| Example 52 | 25% EC, 50% BL, 23% PC, 2% phEC | LiBF$_4$ | 1.5 | 0.52 | 84 | 47 | 5 | 3 |
| Example 53 | 30% EC, 60% BL, 9% PC, 1% phEC | LiBF$_4$ | 1.5 | 0.52 | 78 | 40 | 4 | 1 |
| Example 54 | 22% EC, 44% BL, 33% PC, 1% phEC | LiBF$_4$ | 1.5 | 0.52 | 78 | 51 | 6 | 4 |

TABLE 7

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 55 | 20% EC, 60% BL, 18% PC, 2% Crown | LiBF$_4$ | 1.5 | 0.52 | 82 | 44 | 4 | 1 |
| Example 56 | 22% EC, 66% BL, 11% PC, 1% Crown | LiBF$_4$ | 1.5 | 0.52 | 78 | 40 | 4 | 1 |
| Example 57 | 25% EC, 50% BL, 23% PC, 2% Crown | LiBF$_4$ | 1.5 | 0.52 | 84 | 46 | 5 | 2 |
| Example 58 | 30% EC, 60% BL, 9% PC, 1% Crown | LiBF$_4$ | 1.5 | 0.52 | 80 | 38 | 4 | 1 |
| Example 59 | 22% EC, 44% BL, 33% PC, 1% Crown | LiBF$_4$ | 1.5 | 0.52 | 76 | 48 | 6 | 2 |
| Example 60 | 20% EC, 60% BL, 18% PC, 2% Ether | LiBF$_4$ | 1.5 | 0.52 | 81 | 43 | 5 | 1 |
| Example 61 | 22% EC, 66% BL, 11% PC, 1% Ether | LiBF$_4$ | 1.5 | 0.52 | 77 | 40 | 4 | 1 |
| Example 62 | 25% EC, 50% BL, 23% PC, 2% Ether | LiBF$_4$ | 1.5 | 0.52 | 85 | 45 | 5 | 2 |
| Example 63 | 30% EC, 60% BL, 9% PC, 1% Ether | LiBF$_4$ | 1.5 | 0.52 | 80 | 36 | 4 | 1 |
| Example 64 | 22% EC, 44% BL, 33% PC, 1% Ether | LiBF$_4$ | 1.5 | 0.52 | 79 | 48 | 6 | 2 |

TABLE 8

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 65 | 25% EC, 72% BL, 2% PC, 0.5% VC, 0.5% VEC | LiBF$_4$ | 1.5 | 0.52 | 44 | 61 | more than 20 | 1 |
| Example 66 | 25% EC, 65% BL, 9% PC, 0.5% VC, 0.5% VEC | LiBF$_4$ | 1.5 | 0.52 | 49 | 61 | more than 20 | 1 |
| Example 67 | 20% EC, 60% BL, 18% PC, 1% VC, 1% VEC | LiBF$_4$ | 1.5 | 0.52 | 42 | 68 | more than 20 | 3 |
| Example 68 | 22% EC, 66% BL, 11% PC, 0.5% VC, 0.5% VEC | LiBF$_4$ | 1.5 | 0.52 | 50 | 62 | more than 20 | 1 |
| Example 69 | 25% EC, 50% BL, 23% PC, 1% VC, 1% VEC | LiBF$_4$ | 1.5 | 0.52 | 40 | 69 | more than 20 | 3 |

TABLE 8-continued

|  | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 70 | 30% EC, 60% BL, 9% PC, 0.5% VC, 0.5% VEC | LiBF$_4$ | 1.5 | 0.52 | 50 | 61 | more than 20 | 1 |
| Example 71 | 30% EC, 60% BL, 9.8% PC, 0.1% VC, 0.1% VEC | LiBF$_4$ | 1.5 | 0.52 | 78 | 53 | more than 20 | 1 |
| Example 72 | 31% EC, 62% BL, 2% PC, 2% VC, 3% VEC | LiBF$_4$ | 1.5 | 0.52 | 37 | 41 | more than 20 | 3 |
| Example 73 | 15% EC, 50% BL, 30% PC, 2% VC, 3% VEC | LiBF$_4$ | 1.5 | 0.52 | 37 | 40 | more than 20 | 3 |
| Example 74 | 22% EC, 40% BL, 33% PC, 0.5% VC, 0.5% VEC | LiBF$_4$ | 1.5 | 0.52 | 48 | 69 | more than 20 | 1 |

TABLE 9

|  | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 75 | 20% EC, 60% BL, 18% PC, 1% VC, 1% ES | LiBF$_4$ | 1.5 | 0.52 | 79 | 60 | 8 | 3 |
| Example 76 | 22% EC, 66% BL, 11% PC, 0.5% VC, 0.5% ES | LiBF$_4$ | 1.5 | 0.52 | 80 | 53 | 5 | 1 |
| Example 77 | 25% EC, 50% BL, 23% PC, 1% VC, 1% ES | LiBF$_4$ | 1.5 | 0.52 | 81 | 62 | 8 | 2 |
| Example 78 | 30% EC, 60% BL, 9% PC, 0.5% VC, 0.5% ES | LiBF$_4$ | 1.5 | 0.52 | 80 | 58 | 5 | 2 |
| Example 79 | 22% EC, 44% BL, 33% PC, 0.5% VC, 0.5% ES | LiBF$_4$ | 1.5 | 0.52 | 81 | 63 | 6 | 3 |
| Example 80 | 20% EC, 60% BL, 18% PC, 1% VC, 1% phEC | LiBF$_4$ | 1.5 | 0.52 | 83 | 50 | 12 | 3 |
| Example 81 | 22% EC, 66% BL, 11% PC, 0.5% VC, 0.5% phEC | LiBF$_4$ | 1.5 | 0.52 | 77 | 45 | 7 | 1 |
| Example 82 | 25% EC, 50% BL, 23% PC, 1% VC, 1% phEC | LiBF$_4$ | 1.5 | 0.52 | 85 | 53 | 12 | 2 |
| Example 83 | 30% EC, 60% BL, 9% PC, 0.5% VC, 0.5% phEC | LiBF$_4$ | 1.5 | 0.52 | 81 | 45 | 7 | 2 |
| Example 84 | 22% EC, 44% BL, 33% PC, 0.5% VC, 0.5% phEC | LiBF$_4$ | 1.5 | 0.52 | 80 | 56 | 9 | 4 |

TABLE 10

|  | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 85 | 20% EC, 60% BL, 18% PC, 1% VC, 1% Crown | LiBF$_4$ | 1.5 | 0.52 | 82 | 49 | 12 | 3 |
| Example 86 | 22% EC, 66% BL, 11% PC, 0.5% VC, 0.5% Crown | LiBF$_4$ | 1.5 | 0.52 | 79 | 45 | 7 | 1 |
| Example 87 | 25% EC, 50% BL, 23% PC, 1% VC, 1% Crown | LiBF$_4$ | 1.5 | 0.52 | 83 | 52 | 12 | 2 |
| Example 88 | 30% EC, 60% BL, 9% PC, 0.5% VC, 0.5% Crown | LiBF$_4$ | 1.5 | 0.52 | 80 | 43 | 7 | 2 |
| Example 89 | 22% EC, 44% BL, 33% PC, 0.5% VC, 0.5% Crown | LiBF$_4$ | 1.5 | 0.52 | 80 | 54 | 10 | 2 |
| Example 90 | 20% EC, 60% BL, 18% PC, 1% VC, 1% Ether | LiBF$_4$ | 1.5 | 0.52 | 82 | 47 | 12 | 3 |
| Example 91 | 22% EC, 66% BL, 11% PC, 0.5% VC, 0.5% Ether | LiBF$_4$ | 1.5 | 0.52 | 79 | 45 | 7 | 1 |
| Example 92 | 25% EC, 50% BL, 23% PC, 1% VC, 1% Ether | LiBF$_4$ | 1.5 | 0.52 | 84 | 52 | 12 | 2 |
| Example 93 | 30% EC, 60% BL, 9% PC, 0.5% VC, 0.5% Ether | LiBF$_4$ | 1.5 | 0.52 | 81 | 42 | 7 | 2 |

TABLE 10-continued

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 94 | 22% EC, 44% BL, 33% PC, 0.5% VC, 0.5% Ether | LiBF$_4$ | 1.5 | 0.52 | 80 | 55 | 9 | 3 |

As apparent from the comparison between the results shown in Tables 5 to 10 above and the results of Comparative Examples 1 to 11 shown in Table 2, the secondary battery for each of Examples 35 to 94 of the present invention permits a high discharge capacity and a high capacity retention rate at room temperature and at 45° C., and also permits suppressing the voltage drop caused by the self-discharge during storage at 65° C. and permits diminishing the swelling during storage at 85° C.

On the other hand, the secondary batteries for Comparative Examples 1 to 11 are inferior to the secondary batteries for Examples 35 to 94 in the capacity retention rate at room temperature and at 45° C.

Figure 3:
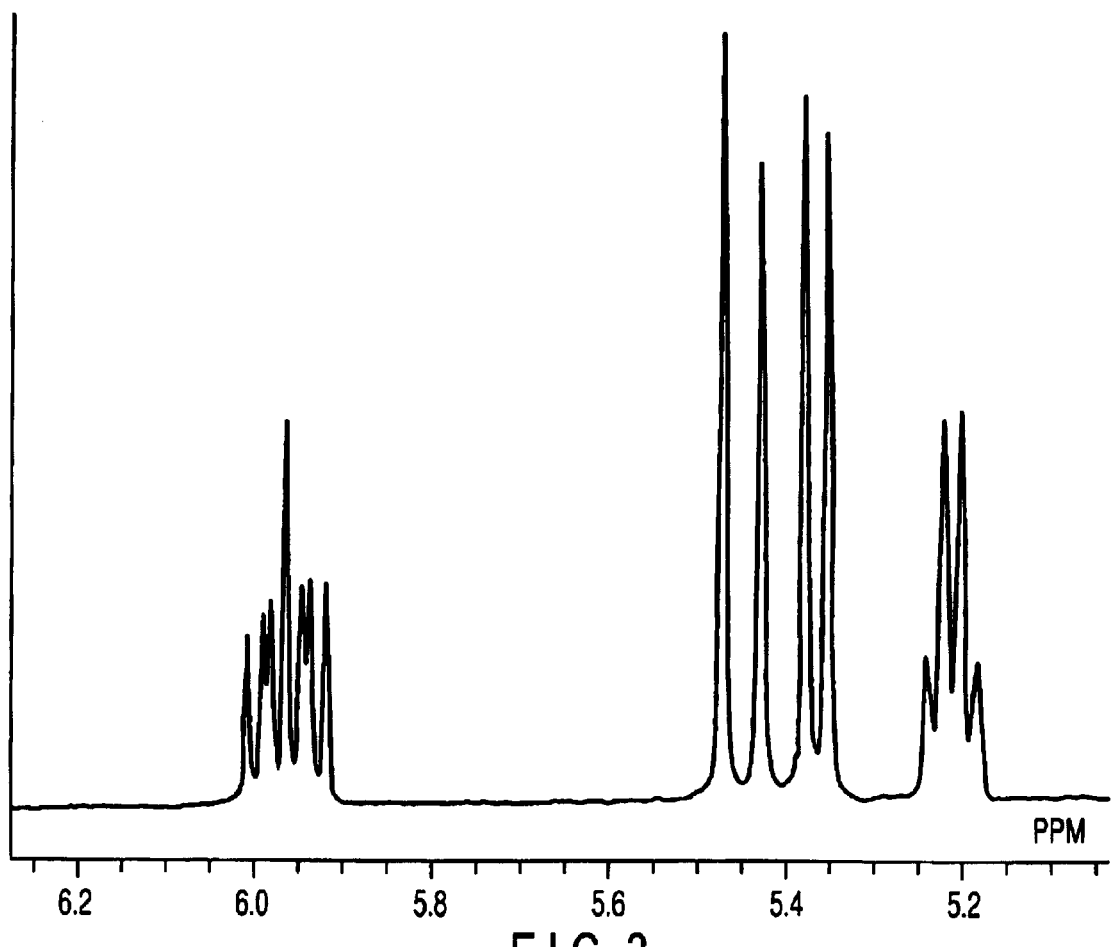
FIG. 3 shows the $^1$HNMR spectrum of the nonaqueous electrolyte used in the thin type nonaqueous electrolyte secondary battery for Example 35 of the present invention.

Also, the charge-discharge circuit of the secondary battery for Example 35 was left open for 5 hours or more after the initial charge-discharge process so as to settle the potential sufficiently, followed by dismantling the secondary battery within a glove box having an Ar concentration of at least 99.9% and a dew point not higher than −50° C. so as to take out the electrode group. The electrode group thus taken out was put in a centrifugal sinking tube. The tube was filled with dimethyl sulfoxide (DMSO)-d$_6$, and the tube was sealed. Then, the centrifugal sinking tube was taken out of the glove box and subjected to a centrifugal separation. Further, a mixed solution containing the electrolyte and (DMSO)-d$_6$ was collected from the centrifugal sinking tube within the glove box. About 0.5 mL of the mixed solution was put in a sample tube for an NMR having a diameter of 5 mm for performing the NMR measurement. An apparatus "JNM-LA 400WB" manufactured by JEOL was used for the NMR measurement. The observation nucleus was $^1$H, the observation frequency was 400 MHz, and the internal standard of dimethyl sulfoxide (DMSO)-d$_5$ (2.5 ppm) was used as the standard substance. Further, the measuring temperature was set at 25° C. In the $^1$HNMR spectrum, the peak corresponding to EC was observed around 4.5 ppm, and the peak corresponding to VEC was observed around 5.2 ppm, 5.4 ppm and 6 ppm, supporting that VEC was contained in the nonaqueous solvent present in the secondary battery for Example 35 after the initial charge-discharge process. Also, a ratio of the NMR integration intensity for VEC to the NMR integration intensity for EC was obtained. It has been found that the ratio of VEC to the entire nonaqueous solvent was decreased from the value before assembly of the secondary battery. For reference, FIG. 3 shows the $^1$HNMR spectrum of the nonaqueous electrolyte used in Example 35.

EXAMPLES 95 to 104

Liquid nonaqueous electrolytes were prepared by dissolving the solute shown in Table 11 in the nonaqueous solvents having the compositions shown in Table 11 in concentrations shown in Table 11. Then, thin type nonaqueous electrolyte secondary batteries were manufactured as in Example 23, except that used were the liquid nonaqueous electrolytes thus prepared.

In Table 11, "VEC" denotes vinylethylene carbonate, "ES" denotes ethylene sulfite, "phEC" denotes phenylethylene carbonate, "Crown" denotes 12-crown-4, and "Ether" denotes tetraethylene glycol dimethyl ether.

The capacity retention rate at room temperature and at 45° C., the maximum discharge capacity, the storage characteristics under an environment of 65° C. and the swelling at 85° C. were measured under the conditions similar to those for Example 1 in respect of the secondary battery obtained in each of Examples 95 to 104. Table 11 also shows the results.

TABLE 11

(metal can)

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 95 | 30% EC, 60% BL, 9.5% PC, 0.5% VEC | LiBF$_4$ | 1.5 | 0.52 | 51 | 55 | more than 20 | 1 |
| Example 96 | 30% EC, 60% BL, 9.5% PC, 0.5% ES | LiBF$_4$ | 1.5 | 0.52 | 80 | 53 | 3 | 1 |
| Example 97 | 30% EC, 60% BL, 9% PC, 1% phEC | LiBF$_4$ | 1.5 | 0.52 | 78 | 41 | 4 | 1 |
| Example 98 | 30% EC, 60% BL, 9% PC, 1% Crown | LiBF$_4$ | 1.5 | 0.52 | 80 | 40 | 4 | 1 |
| Example 99 | 30% EC, 60% BL, 9% PC, 1% Ether | LiBF$_4$ | 1.5 | 0.52 | 79 | 38 | 4 | 1 |
| Example 100 | 30% EC, 60% BL, 9% PC, 0.5% VC, 0.5% VEC | LiBF$_4$ | 1.5 | 0.52 | 50 | 60 | more than 20 | 1 |
| Example 101 | 30% EC, 60% BL, 9% PC, 0.5% VC, 0.5% ES | LiBF$_4$ | 1.5 | 0.52 | 79 | 57 | 5 | 1 |

TABLE 11-continued (metal can)

| | Composition of nonaqueous solvent (% by volume) | Solute | Solute concentration (mol/L) | Maximum discharge capacity (Ah) | Capacity retention rate, 400 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 102 | 30% EC, 60% BL, 9% PC, 0.5% VC, 0.5% phEC | LiBF$_4$ | 1.5 | 0.52 | 80 | 46 | 7 | 1 |
| Example 103 | 30% EC, 60% BL, 9% PC, 0.5% VC, 0.5% Crown | LiBF$_4$ | 1.5 | 0.52 | 80 | 43 | 7 | 1 |
| Example 104 | 30% EC, 60% BL, 9% PC, 0.5% VC, 0.5% Ether | LiBF$_4$ | 1.5 | 0.52 | 81 | 43 | 7 | 1 |

As apparent from the comparison between the results shown in Table 11 above and the results of Comparative Examples 12 to 17 shown in Table 3, the secondary battery for each of Examples 95 to 104 of the present invention, which comprises a liquid nonaqueous electrolyte containing the nonaqueous solvent A or nonaqueous solvent C, permits a high discharge capacity and a high capacity retention rate at room temperature and at 45° C., and also permits suppressing the voltage drop caused by the self-discharge during storage at 65° C. and permits diminishing the swelling during storage at 85° C.

On the other hand, the secondary batteries for Comparative Examples 12 to 17 are inferior to the secondary batteries for Examples 95 to 104 in the capacity retention rate at room temperature and at 45° C.

EXAMPLES 105 to 124

Liquid nonaqueous electrolytes were prepared by dissolving the solutes shown in Tables 12 and 13 in the nonaqueous solvents having the compositions shown in Table 12 and 13 in concentrations shown in Table 12 and 13. Then, thin type nonaqueous electrolyte secondary batteries were manufactured as in Example 29, except that used were the liquid nonaqueous electrolytes thus prepared.

In Tables 12 and 13, "VEC" denotes vinylethylene carbonate, "ES" denotes ethylene sulfite, "phEC" denotes phenylethylene carbonate, "Crown" denotes 12-crown-4, and "Ether" denotes tetraethylene glycol dimethyl ether.

The capacity retention rate at room temperature and at 45° C., the maximum discharge capacity, the storage characteristics under an environment of 65° C. and the swelling at 85° C. were measured under the conditions similar to those for Example 29 in respect of the secondary battery obtained in each of Examples 105 to 124. Tables 12 and 13 also show the results.

TABLE 12

(Gel-like nonaqueous electrolyte)

| | Composition of nonaqueous solvent (% by volume) | Solute | Solute concentration (mol/L) | Maximum discharge capacity (Ah) | Capacity retention rate, 300 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 105 | 25% EC, 50% BL, 24% PC, 1% VEC | LiBF$_4$ | 1.5 | 0.42 | 35 | 56 | more than 20 | 1 |
| Example 106 | 30% EC, 60% BL, 9.5% PC, 0.5% VEC | LiBF$_4$ | 1.5 | 0.42 | 47 | 50 | more than 20 | 1 |
| Example 107 | 25% EC, 50% BL, 24% PC, 1% ES | LiBF$_4$ | 1.5 | 0.42 | 78 | 52 | 4 | 1 |
| Example 108 | 30% EC, 60% BL, 9.5% PC, 0.5% ES | LiBF$_4$ | 1.5 | 0.42 | 77 | 47 | 4 | 1 |
| Example 109 | 25% EC, 50% BL, 23% PC, 2% phEC | LiBF$_4$ | 1.5 | 0.42 | 82 | 42 | 6 | 1 |
| Example 110 | 30% EC, 60% BL, 9% PC, 1% phEC | LiBF$_4$ | 1.5 | 0.42 | 75 | 38 | 5 | 1 |
| Example 111 | 25% EC, 50% BL, 23% PC, 2% Crown | LiBF$_4$ | 1.5 | 0.42 | 81 | 43 | 6 | 1 |
| Example 112 | 30% EC, 60% BL, 9% PC, 1% Crown | LiBF$_4$ | 1.5 | 0.42 | 78 | 35 | 5 | 1 |
| Example 113 | 25% EC, 50% BL, 23% PC, 2% Ether | LiBF$_4$ | 1.5 | 0.42 | 82 | 40 | 6 | 1 |
| Example 114 | 30% EC, 60% BL, 9% PC, 1% Ether | LiBF$_4$ | 1.5 | 0.42 | 78 | 33 | 5 | 1 |

TABLE 13

(Gel-like nonaqueous electrolyte)

| | Composition of nonaqueous solvent (% by volume) | Solute | Solute concentration (mol/L) | Maximum discharge capacity (Ah) | Capacity retention rate, 300 cycles/ 20° C. (%) | Capacity retention rate, 200 cycles/ 45° C. (%) | Storage characteristics (day) | Swelling after storage at 85° C. (%) |
|---|---|---|---|---|---|---|---|---|
| Example 115 | 25% EC, 50% BL, 23% PC, 1% VC, 1% VEC | LiBF$_4$ | 1.5 | 0.42 | 37 | 65 | more than 20 | 1 |
| Example 116 | 30% EC, 60% BL, 9% PC, 0.5% VC, 0.5% VEC | LiBF$_4$ | 1.5 | 0.42 | 47 | 57 | more than 20 | 1 |
| Example 117 | 25% EC, 50% BL, 23% PC, 1% VC, 1% ES | LiBF$_4$ | 1.5 | 0.42 | 78 | 56 | 9 | 2 |
| Example 118 | 30% EC, 60% BL, 9% PC, 0.5% VC, 0.5% ES | LiBF$_4$ | 1.5 | 0.42 | 78 | 51 | 6 | 1 |
| Example 119 | 25% EC, 50% BL, 23% PC, 1% VC, 1% phEC | LiBF$_4$ | 1.5 | 0.42 | 82 | 48 | 13 | 2 |
| Example 120 | 30% EC, 60% BL, 9% PC, 0.5% VC, 0.5% phEC | LiBF$_4$ | 1.5 | 0.42 | 78 | 40 | 8 | 1 |
| Example 121 | 25% EC, 50% BL, 23% PC, 1% VC, 1% Crown | LiBF$_4$ | 1.5 | 0.42 | 80 | 48 | 13 | 1 |
| Example 122 | 30% EC, 60% BL, 9% PC, 0.5% VC, 0.5% Crown | LiBF$_4$ | 1.5 | 0.42 | 78 | 39 | 8 | 1 |
| Example 123 | 25% EC, 50% BL, 23% PC, 1% VC, 1% Ether | LiBF$_4$ | 1.5 | 0.42 | 81 | 47 | 13 | 1 |
| Example 124 | 30% EC, 60% BL, 9% PC, 0.5% VC, 0.5% Ether | LiBF$_4$ | 1.5 | 0.42 | 79 | 38 | 8 | 1 |

As apparent from the comparison between the results shown in Tables 12 and 13 above and the results of Comparative Examples 18 to 24 shown in Table 4, the secondary battery for each of Examples 105 to 124 of the present invention, which comprises a gel-like nonaqueous electrolyte containing the nonaqueous solvent A or nonaqueous solvent C, permits a high discharge capacity and a high capacity retention rate at room temperature and at 45° C., and also permits suppressing the voltage drop caused by the self-discharge during storage at 65° C. and permits diminishing the swelling during storage at 85° C.

On the other hand, the secondary batteries for Comparative Examples 18 to 24 are inferior to the secondary batteries for Examples 105 to 124 in the capacity retention rate at room temperature and at 45° C.

EXAMPLES 125 to 131

Comparative Example 25

Thin type nonaqueous electrolyte secondary batteries were manufactured as in Example 1, except that the compositions of the nonaqueous solvents were changed as shown in Table 14.

The maximum discharge capacity and the swelling at 85° C. were measured for the secondary battery for each of Examples 125 to 131 and Comparative Example 25. Table 14 also shows the results.

Figure 4:
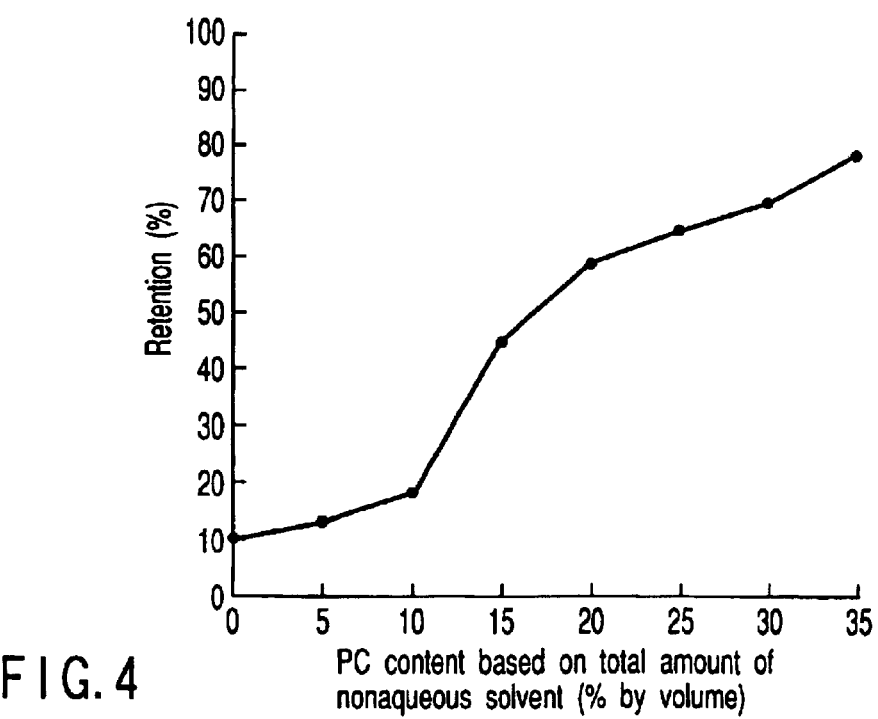
FIG. 4 is a graph showing the relationship between the PC content and the capacity retention rate after 100 charge-discharge cycles at 60° C. of the secondary battery for each of Examples 125 to 131 of the present invention and Comparative Example 25.

Also, a charge-discharge cycle, in which a constant current-constant voltage charging to 4.2 V was performed for 3 hours with a current of 1 C., followed by discharging the secondary battery to 3 V with a current of 1 C., was repeated under an environment of 60° C. for the secondary battery for each of Examples 125 to 131 and Comparative Example 25 so as to measure the capacity retention rate after 100 charge-discharge cycles. The results are shown in Table 14 and FIG. 4. FIG. 4 is a graph showing the relationship between the PC content (% by volume) based on the total amount of the nonaqueous solvent, which is plotted on the abscissa, and the capacity retention rate after 100 charge-discharge cycles, which is plotted on the ordinate.

TABLE 14

| | Composition of nonaqueous solvent (% by volume) | Solute | Solute concentration (mol/L) | Maximum discharge capacity (Ah) | Capacity retention rate (%) after 100 cycles under environment of 60° C. (%) | Swelling after storage at 85° C. % |
|---|---|---|---|---|---|---|
| Comparative example 25 | 33% EC, 66% BL, 1% VC | LiBF$_4$ | 1.5 | 0.52 | 11 | 2 |
| Example 125 | 31% EC, 63% BL, 5% PC, 1% VC | LiBF$_4$ | 1.5 | 0.52 | 13 | 2 |
| Example 126 | 30% EC, 59% BL, 10% PC, 1% VC | LiBF$_4$ | 1.5 | 0.52 | 18 | 2 |
| Example 127 | 28% EC, 56% BL, 15% PC, 1% VC | LiBF$_4$ | 1.5 | 0.52 | 44 | 3 |
| Example 128 | 26% EC, 53% BL, 20% PC, 1% VC | LiBF$_4$ | 1.5 | 0.52 | 58 | 3 |

TABLE 14-continued

|  | Composition of nonaqueous solvent (% by volume) | Solute | Solute concentration (mol/L) | Maximum discharge capacity (Ah) | Capacity retention rate (%) after 100 cycles under environment of 60° C. (%) | Swelling after storage at 85° C. % |
|---|---|---|---|---|---|---|
| Example 129 | 25% EC, 49% BL, 25%PC, 1%VC | LiBF$_4$ | 1.5 | 0.52 | 64 | 4 |
| Example 130 | 23% EC, 46% BL, 30% PC, 1% VC | LiBF$_4$ | 1.5 | 0.52 | 69 | 4 |
| Example 131 | 21% EC, 43% BL, 35% PC, 1% VC | LiBF$_4$ | 1.5 | 0.52 | 77 | 5 |

As apparent from Table 14 and FIG. 4, the secondary battery for each of Examples 127 to 131, in which the PC content based on the total amount of the nonaqueous solvent exceeds 10% by volume, exhibits a high capacity retention rate after 100 charge-discharge cycles under a very high temperature of 60° C., compared with the secondary battery for each of Examples 125, 126 and Comparative Example 25, in which the PC content based on the total amount of the nonaqueous solvent is not higher than 10% by volume.

EXAMPLE 132

≦Preparation of Liquid Nonaqueous Electrolyte>

Prepared was a nonaqueous solvent by mixing ethylene carbonate (EC), propylene carbonate (PC), γ-butyrolactone (BL) and vinylene carbonate (VC) at a volume ratio of 20 (EC):18 (PC):60 (BL):2 (VC). Then, lithium tetrafluoro borate (LiBF$_4$) used as a first solute was dissolved in the resultant nonaqueous solvent in a concentration of 1.5 mol/L, followed by further dissolving LiN(C$_2$F$_5$SO$_2$)$_2$ used a second solute in the resultant nonaqueous electrolyte in a concentration of 0.2 mol/L, so as to obtain a liquid nonaqueous electrolyte.

Then, a thin type nonaqueous electrolyte secondary battery was manufactured as in Example 1, except that used was the liquid nonaqueous electrolyte thus prepared.

EXAMPLES 133 to 137

Thin type nonaqueous electrolyte secondary batteries were manufactured as in Example 132, except that used were the nonaqueous solvents having the compositions shown in Tables 15 and 16.

The capacity retention rate at room temperature and at 45° C., the maximum discharge capacity, the storage characteristics under an environment of 65° C. and the swelling at 85° C. were measured under the conditions similar to those for Example 1 in respect of the secondary battery obtained in each of Examples 132 to 137. Tables 15 and 16 also show the results. Incidentally, the results for Examples 3, 37, 45, 50, 55 and 60 are also shown in Tables 15 and 16.

TABLE 15

|  | Composition of nonaqueous solvent (% by volume) | First solute | First solute concentration (mol/L) | Second solute | Second solute concentration (mol/L) | Maximum discharge capacity (Ah) | Capacity retention rate (%) after 400 cycles under environment of 20° C. (%) | Capacity retention rate (%) after 200 cycles under environment of 45° C. (%) | Storage characteristics (day) | Swelling after storage at 85° C. (%) |
|---|---|---|---|---|---|---|---|---|---|---|
| Example 132 | 20% EC, 60% BL, 18% PC, 2% VC | LiBF$_4$ | 1.5 | LiN(C$_2$F$_5$SO$_2$)$_2$ | 0.2 | 0.52 | 83 | 62 | more than 20 | 4 |
| Example 3 | 20% EC, 60% BL, 18% PC, 2% VC | LiBF$_4$ | 1.5 | none | — | 0.52 | 83 | 60 | more than 20 | 3 |
| Example 133 | 20% EC, 60% BL, 19% PC, 1% VEC | LiBF$_4$ | 1.5 | LiN(C$_2$F$_5$SO$_2$)$_2$ | 0.2 | 0.52 | 40 | 69 | more than 20 | 1 |
| Example 37 | 20% EC, 60% BL, 19% PC, 1% VEC | LiBF$_4$ | 1.5 | none | — | 0.52 | 40 | 66 | more than 20 | 1 |
| Example 134 | 20% EC, 60% BL, 19% PC, 1% ES | LiBF$_4$ | 1.5 | LiN(C$_2$F$_5$SO$_2$)$_2$ | 0.2 | 0.52 | 79 | 58 | 4 | 2 |
| Example 45 | 20% EC, 60% BL, 19% PC, 1% ES | LiBF$_4$ | 1.5 | none | — | 0.52 | 78 | 55 | 3 | 1 |

TABLE 16

| | Composition of nonaqueous solvent (% by volume) | First solute | First solute concentration (mol/L) | Second solute | Second solute concentration (mol/L) | Maximum discharge capacity (Ah) | Capacity retention rate (%) after 400 cycles under environment of 20° C. (%) | Capacity retention rate (%) after 200 cycles under environment of 45° C. (%) | Storage characteristics (day) | Swelling after storage at 85° C. (%) |
|---|---|---|---|---|---|---|---|---|---|---|
| Example 135 | 20% EC, 60% BL, 18% PC, 2% phEC | $LiBF_4$ | 1.5 | $LiN(C_2F_5SO_2)_2$ | 0.2 | 0.52 | 82 | 48 | 5 | 3 |
| Example 50 | 20% EC, 60% BL, 18% PC, 2% phEC | $LiBF_4$ | 1.5 | none | — | 0.52 | 82 | 45 | 4 | 1 |
| Example 136 | 20% EC, 60% BL, 18% PC, 2% Crown | $LiBF_4$ | 1.5 | $LiN(C_2F_5SO_2)_2$ | 0.2 | 0.52 | 81 | 48 | 5 | 2 |
| Example 55 | 20% EC, 60% BL, 18% PC, 2% Crown | $LiBF_4$ | 1.5 | none | — | 0.52 | 82 | 44 | 4 | 1 |
| Example 137 | 20% EC, 60% BL, 18% PC, 2% Ether | $LiBF_4$ | 1.5 | $LiN(C_2F_5SO_2)_2$ | 0.2 | 0.52 | 81 | 46 | 6 | 3 |
| Example 60 | 20% EC, 60% BL, 18% PC, 2% Ether | $LiBF_4$ | 1.5 | none | — | 0.52 | 81 | 43 | 5 | 1 |

As apparent from the comparison between Examples 132 and 3, between Examples 133 and 37, between Examples 134 and 45, between Examples 135 and 50, between Examples 136 and 55 and between Examples 137 and 60 shown in Tables 15 and 16, the capacity retention rate after 200 charge-discharge cycles under a high temperature of 45° C. can be improved in the case of using a mixed salt of $LiBF_4$ and $LiN(C_2F_5SO_2)_2$ as the solute, compared with the case of using $LiBF_4$ alone as the solute. It is also seen that the secondary battery for each of Examples 132 to 137, in which a mixed salt of $LiBF_4$ and $LiN(C_2F_5SO_2)_2$ was used as the solute, permits suppressing the progress of self-discharge at 65° C.

EXAMPLES 138 to 143

Thin type nonaqueous electrolyte secondary batteries were manufactured as in Example 1, except that used were the nonaqueous solvents having the compositions shown in Table 17.

The maximum discharge capacity, the capacity retention rate at 45° C. and the swelling at 85° C. were measured under the conditions similar to those for Example 1 in respect of the secondary battery obtained in each of Examples 138 to 143. Table 17 also shows the results. Incidentally, the results for Examples 3 and 37 are also shown in Table 17.

TABLE 17

| | Composition of nonaqueous solvent (% by volume) | Solute | Solute concentration (mol/L) | Maximum discharge capacity (Ah) | Capacity retention rate (%) after 200 cycles at 45° C. | Swelling after storage at 85° C. (%) |
|---|---|---|---|---|---|---|
| Example 3 | 20% EC, 60% BL, 18% PC, 2% VC | $LiBF_4$ | 1.5 | 0.52 | 60 | 3 |
| Example 138 | 20% EC, 58% BL, 18% PC, 2% VC, 2% DEC | LiBF4 | 1.5 | 0.52 | 63 | 4 |
| Example 139 | 20% EC, 59.5% BL, 18% PC, 2% VC, 0.5% CATC | $LiBF_4$ | 1.5 | 0.52 | 64 | 3 |
| Example 140 | 20% EC, 58% BL, 18% PC, 2% VC, 2% MEC | $LiBF_4$ | 1.5 | 0.52 | 62 | 4 |
| Example 37 | 20% EC, 60% BL, 19% PC, 1% VEC | $LiBF_4$ | 1.5 | 0.52 | 66 | 1 |
| Example 141 | 20% EC, 58% BL, 19% PC, 1% VEC, 2% DEC | $LiBF_4$ | 1.5 | 0.52 | 69 | 3 |
| Example 142 | 20% EC, 59.5% BL, 19% PC, 1% VEC, 0.5% CATC | $LiBF_4$ | 1.5 | 0.52 | 69 | 1 |
| Example 143 | 20% EC, 58% BL, 19% PC, 1% VEC, 2% MEC | $LiBF_4$ | 1.5 | 0.52 | 68 | 3 |

As apparent from Table 17, the secondary battery for each of Examples 138 to 140, which contained a fourth component of the solvent including VC and at least one kind of the solvent selected from the group consisting of DEC, DMC, EMC, VL, MP, EP, 2Me-F, F, TIOP and CATC, exhibited a high capacity retention rate after 200 charge-discharge cycles at a high temperature of 45° C., compared with the case of using VC alone as the fourth component.

Also, as apparent from Table 17, the secondary battery for each of Examples 141 to 143, which contained a fourth component of the solvent including VEC and at least one kind of the solvent selected from the group consisting of DEC, DMC, EMC, VL, MP, EP, 2Me-F, F, TIOP and CATC, exhibited a high capacity retention rate after 200 charge-discharge cycles at a high temperature of 45° C., compared with the case of using VEC alone as the fourth component.

Incidentally, in the secondary battery for each of Examples 1 to 137, each of the fourth component and the fifth component of the nonaqueous solvent was formed of a single kind of the solvent. However, the charge-discharge cycle life of the secondary battery at 45° C. can be improved while suppressing the swelling of the case when the secondary battery is stored at 85° C. and the self-discharge of the secondary battery under an environment of 65° C., even if each of the fourth component and the fifth component of the nonaqueous solvent is formed of a plurality of different kinds of the solvents.

As described above in detail, the nonaqueous electrolyte and the nonaqueous electrolyte secondary battery of the present invention produce prominent effects. For example, it is possible to improve the charge-discharge cycle life.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte comprising a nonaqueous solvent and a solute dissolved in said nonaqueous solvent, wherein:

said nonaqueous solvent contains ethylene carbonate (EC), propylene carbonate (PC), γ-butyrolactone (BL), and a fourth component which includes at least one solvent selected from the group consisting of vinylene carbonate, vinylethylene carbonate, ethylene sulfite, phenylethylene carbonate, 12-crown-4 and tetraethylene glycol dimethyl ether; and the mixing ratio x (% by volume) of ethylene carbonate based on the total amount of the nonaqueous solvent falls within a range of 15 to 50, the mixing ratio y (% by volume) of propylene carbonate based on the total amount of the nonaqueous solvent falls within a range of larger than 10 and not larger than 35, the mixing ratio z (% by volume) of γ-butyrolactone based on the total amount of the nonaqueous solvent falls within a range of 30 to 85, and the mixing ratio p (% by volume) of said fourth component based on the total amount of the nonaqueous solvent is larger than 0 and is not larger than 5.

2. The nonaqueous electrolyte according to claim 1, wherein said fourth component is vinylene carbonate, and the mixing ratio p of said fourth component meets the condition of $0.05 \leq p \leq 5$.

3. The nonaqueous electrolyte according to claim 1, wherein said fourth component is vinylene carbonate, the mixing ratio y of propylene carbonate meets the condition of $10 < y \leq 30$, the mixing ratio z of γ-butyrolactone meets the condition of $35 \leq z \leq 85$, and the mixing ratio p of said fourth component meets the condition of $0.05 \leq p \leq 5$.

4. A nonaqueous electrolyte secondary battery, comprising a case having a wall thickness not larger than 0.3 mm, an electrode group provided in said case, and a nonaqueous electrolyte which is provided in said case and contains a nonaqueous solvent and a solute dissolved in said nonaqueous solvent, wherein:

said nonaqueous solvent contains ethylene carbonate (EC), propylene carbonate (PC), γ-butyrolactone (BL), and a fourth component which includes at least one solvent selected from the group consisting of vinylene carbonate, vinylethylene carbonate, ethylene sulfite, phenylethylene carbonate 12-crown-4 and tetraethylene glycol dimethyl ether; and the mixing ratio x (% by volume) of ethylene carbonate based on the total amount of the nonaqueous solvent falls within a range of 15 to 50, the mixing ratio y (% by volume) of propylene carbonate based on the total amount of the nonaqueous solvent falls within a range of larger than 10 and not larger than 35, the mixing ratio z (% by volume) of γ-butyrolactone based on the total amount of the nonaqueous solvent falls within a range of 30 to 85, and the mixing ratio p (% by volume) of said fourth component based on the total amount of the nonaqueous solvent is larger than 0 and is not larger than 5.

5. The nonaqueous electrolyte secondary battery according to claim 4, wherein said fourth component is vinylene carbonate, and the mixing ratio p of said fourth component meets the condition of $0.05 \leq p \leq 5$.

6. The nonaqueous electrolyte secondary battery according to claim 4, wherein said solute includes at least one kind of lithium salt selected from the group consisting of $LiClO_4$, $LiPF_6$, $LiBF_4$, $LiAsF_6$, $LiCF_3SO_3$, $LiN(CF_3SO_2)_2$ and $LiN(C_2F_5SO_2)_2$.

7. The nonaqueous electrolyte secondary battery according to claim 4, wherein said nonaqueous electrolyte is substantially in the form of a liquid or a gel.

8. The nonaqueous electrolyte secondary battery according to claim 4, wherein said electrode group includes a negative electrode containing a carbonaceous material capable of absorbing-desorbing lithium ions.

9. The nonaqueous electrolyte secondary battery according to claim 8, wherein said carbonaceous material includes a mesophase pitch based carbon fiber.

10. The nonaqueous electrolyte secondary battery according to claim 4, wherein said case is substantially formed of a metal plate, a metal film or a sheet including a resin layer.

11. The nonaqueous electrolyte secondary battery according to claim 4, wherein said fourth component is vinylene carbonate, the mixing ratio y of propylene carbonate meets the condition of $10 < y \leq 30$, the mixing ratio z of γ-butyrolactone meets the condition of $35 \leq z \leq 85$, and the mixing ratio p of said fourth component meets the condition of $0.05 \leq p \leq 5$.

12. A nonaqueous electrolyte secondary battery according to claim 4, wherein the mixing ratio y (% by volume) of propylene carbonate falls within a range of $10 < y \leq 25$.

13. A nonaqueous electrolyte secondary battery according to claim 4, wherein the mixing ratio y (% by volume) of propylene carbonate falls within a range of $10 < y \leq 20$.

14. A nonaqueous electrolyte secondary battery according to claim 4, wherein a content (% by volume) of vinylethylene carbonate in said nonaqueous solvent is 0.1 to 4.

15. A nonaqueous electrolyte secondary battery according to claim 4, wherein said solute contains at least one salt selected from $LiN(CF_3SO_2)_2$ and $LiN(C_2F_5SO_2)_2$ and at least one salt selected from $LiBF_4$ and $LiPF_6$.

16. A nonaqueous electrolyte secondary battery, comprising a case having a wall thickness not larger than 0.3 mm, a positive electrode provided in said case and capable of absorbing-desorbing lithium ions, a negative electrode provided in said case and capable of absorbing-desorbing lithium ions, a separator arranged between said positive electrode and said negative electrode, and a liquid nonaqueous electrolyte impregnated in at least said separator, and said liquid nonaqueous electrolyte containing a nonaqueous solvent and a solute dissolved in said nonaqueous solvent, wherein:

said nonaqueous solvent contains ethylene carbonate, propylene carbonate, γ-butyrolactone and vinylene carbonate; and the mixing ratio x (% by volume) of ethylene carbonate based on the total amount of the nonaqueous solvent falls within a range of 15 to 50, the mixing ratio y (% by volume) of propylene carbonate based on the total amount of the nonaqueous solvent falls within a range of larger than 10 and not larger than 35, the mixing ratio z (% by volume) of γ-butyrolactone based on the total amount of the nonaqueous solvent falls within a range of 30 to 85, and the mixing ratio w (% by volume) of vinylene carbonate based on the total amount of the nonaqueous solvent falls within a range of 0.05 to 5.

17. The nonaqueous electrolyte secondary battery according to claim 16, wherein the mixing ratio y of propylene carbonate meets the condition of $10 < y \leq 30$, and the mixing ratio z of γ-butyrolactone meets the condition of $35 \leq z \leq 85$.

18. A nonaqueous electrolyte secondary battery, comprising a case having a wall thickness not larger than 0.3 mm, a positive electrode provided in said case and capable of absorbing-desorbing lithium ions, a negative electrode provided in said case and capable of absorbing-desorbing lithium ions, and an electrolyte layer arranged between said positive electrode and said negative electrode, and said electrolyte layer containing a nonaqueous solvent and a solute dissolved in said nonaqueous solvent, wherein:

said nonaqueous solvent contains ethylene carbonate, propylene carbonate, γ-butyrolactone and vinylene carbonate; and the mixing ratio x (% by volume) of ethylene carbonate based on the total amount of the nonaqueous solvent falls within a range of 15 to 50, the mixing ratio y (% by volume) of propylene carbonate based on the total amount of the nonaqueous solvent falls within a range of larger than 10 and not larger than 35, the mixing ratio z (% by volume) of γ-butyrolactone based on the total amount of the nonaqueous solvent falls within a range of 30 to 85, and the mixing ratio w (% by volume) of vinylene carbonate based on the total amount of the nonaqueous solvent falls within a range of 0.05 to 5.

19. The nonaqueous electrolyte secondary battery according to claim 18, wherein the mixing ratio y of propylene carbonate meets the condition of $10 < y \leq 30$, and the mixing ratio z of γ-butyrolactone meets the condition of $35 \leq z \leq 85$.

* * * * *